US011553228B2

(12) United States Patent
Zito, Jr.

(10) Patent No.: US 11,553,228 B2
(45) Date of Patent: Jan. 10, 2023

(54) MULTI-MEDIA PRESENTATION SYSTEM

(71) Applicant: Arthur J. Zito, Jr., Elicott, MD (US)

(72) Inventor: Arthur J. Zito, Jr., Elicott, MD (US)

( * ) Notice: Subject to any disclaimer, the term of this patent is extended or adjusted under 35 U.S.C. 154(b) by 0 days.

(21) Appl. No.: 14/773,338

(22) PCT Filed: Mar. 6, 2014

(86) PCT No.: PCT/US2014/021067
§ 371 (c)(1),
(2) Date: Sep. 5, 2015

(87) PCT Pub. No.: WO2014/138352
PCT Pub. Date: Sep. 12, 2014

(65) Prior Publication Data
US 2016/0021412 A1   Jan. 21, 2016

Related U.S. Application Data

(60) Provisional application No. 61/773,806, filed on Mar. 6, 2013.

(51) Int. Cl.
*H04N 21/266* (2011.01)
*H04N 21/2668* (2011.01)
(Continued)

(52) U.S. Cl.
CPC ......... *H04N 21/2668* (2013.01); *G06Q 30/02* (2013.01); *H04N 21/251* (2013.01);
(Continued)

(58) Field of Classification Search
CPC .. H04N 21/2668; H04N 21/00; H04N 21/251; H04N 21/25891; H04N 21/44213;
(Continued)

(56) References Cited

U.S. PATENT DOCUMENTS 5,635,978 A * 6/1997 Alten ............... H04N 5/445
348/569
5,830,064 A * 11/1998 Bradish ............... A63F 13/10
463/22

(Continued)

FOREIGN PATENT DOCUMENTS

| KR | 2011-0085122 A | 7/2011 |
| KR | 10-2012-0050615 A | 5/2012 |
| KR | 10-2012-0051210 A | 5/2012 |

OTHER PUBLICATIONS

International Search Report for PCT/US2014/021067 dated Jun. 26, 2014.
European Search Report for EP 14760920.0 dated Nov. 7, 2016.

*Primary Examiner* — An Son P Huynh
(74) *Attorney, Agent, or Firm* — Fargo Patent & Business Law, PLLC; Thomas Kading

(57) ABSTRACT

A multi-media presentation system includes an input subsystem operable to collect data including an unassisted data input of a viewer from within a natural, unaided sensing range of the viewer; a storage subsystem with a multiple of storage subsystems operable to store the data including the unassisted data input in a storage subsystem in a manner associated with a preference; and a server subsystem operable to selectively display a multi-media presentation in accordance with the preference.

17 Claims, 17 Drawing Sheets

(51) Int. Cl.
*H04N 21/81* (2011.01)
*G06Q 30/02* (2012.01)
*H04N 21/488* (2011.01)
*H04N 21/4788* (2011.01)
*H04N 21/45* (2011.01)
*H04N 21/442* (2011.01)
*H04N 21/25* (2011.01)
*H04N 21/258* (2011.01)

(52) U.S. Cl.
CPC . *H04N 21/25891* (2013.01); *H04N 21/44213* (2013.01); *H04N 21/44226* (2020.08); *H04N 21/4532* (2013.01); *H04N 21/4788* (2013.01); *H04N 21/488* (2013.01); *H04N 21/812* (2013.01)

(58) Field of Classification Search
CPC ......... H04N 21/44222; H04N 21/4532; H04N 21/4788; H04N 21/488; H04N 21/812; G06F 3/14
See application file for complete search history.

(56) References Cited

U.S. PATENT DOCUMENTS

| | | | | |
|---|---|---|---|---|
| 5,977,964 | A * | 11/1999 | Williams | G11B 27/105 |
| | | | | 348/E17.005 |
| 7,383,509 | B2 | 6/2008 | Foote et al. | |
| 7,716,135 | B2 * | 5/2010 | Angell | G06Q 20/10 |
| | | | | 705/44 |
| 8,175,253 | B2 * | 5/2012 | Knott | H04M 3/10 |
| | | | | 379/265.02 |
| 8,196,168 | B1 * | 6/2012 | Bryan | G11B 27/002 |
| | | | | 725/134 |
| 8,230,344 | B2 | 7/2012 | Abujbara et al. | |
| 8,456,293 | B1 * | 6/2013 | Trundle | G08B 21/0423 |
| | | | | 340/517 |
| 8,694,495 | B2 * | 4/2014 | Saito | G06Q 30/02 |
| | | | | 707/732 |
| 8,839,306 | B2 * | 9/2014 | Roberts | H04N 7/17318 |
| | | | | 725/60 |
| 9,032,428 | B2 * | 5/2015 | Wan | H04H 60/45 |
| | | | | 725/10 |
| 9,088,757 | B2 * | 7/2015 | Curtis | H04N 5/76 |
| 9,288,387 | B1 * | 3/2016 | Keller | H04N 21/44218 |
| 9,940,746 | B2 * | 4/2018 | Pound | G06T 13/80 |
| 2002/0021288 | A1 | 2/2002 | Schug | |
| 2002/0056107 | A1 * | 5/2002 | Schlack | H04N 7/17318 |
| | | | | 725/46 |
| 2002/0174430 | A1 * | 11/2002 | Ellis | G11B 27/005 |
| | | | | 725/46 |
| 2003/0054813 | A1 * | 3/2003 | Riley | H04W 64/00 |
| | | | | 455/424 |
| 2003/0067554 | A1 * | 4/2003 | Klarfeld | G11B 27/105 |
| | | | | 348/461 |
| 2003/0093792 | A1 * | 5/2003 | Labeeb | H04N 7/163 |
| | | | | 725/46 |
| 2003/0101450 | A1 * | 5/2003 | Davidsson | G06Q 10/10 |
| | | | | 725/32 |
| 2003/0149988 | A1 * | 8/2003 | Ellis | H04N 5/44543 |
| | | | | 725/87 |
| 2004/0001106 | A1 | 1/2004 | Deutscher et al. | |
| 2004/0230572 | A1 | 11/2004 | Omoigui | |
| 2004/0233210 | A1 * | 11/2004 | Hancock | G06F 3/14 |
| | | | | 345/582 |
| 2005/0028208 | A1 * | 2/2005 | Ellis | H04N 7/163 |
| | | | | 725/58 |
| 2005/0149964 | A1 * | 7/2005 | Thomas | G06Q 30/02 |
| | | | | 725/9 |
| 2005/0262542 | A1 * | 11/2005 | DeWeese | H04L 12/1818 |
| | | | | 725/106 |
| 2005/0289582 | A1 * | 12/2005 | Tavares | G06K 9/00221 |
| | | | | 725/10 |
| 2006/0062363 | A1 * | 3/2006 | Albrett | G06Q 30/02 |
| | | | | 379/101.01 |
| 2006/0150216 | A1 * | 7/2006 | Herz | G06Q 20/383 |
| | | | | 725/50 |
| 2006/0204058 | A1 * | 9/2006 | Kim | G06K 9/00288 |
| | | | | 382/118 |
| 2007/0081197 | A1 | 4/2007 | Omoigui | |
| 2007/0101251 | A1 | 5/2007 | Lee et al. | |
| 2007/0140532 | A1 * | 6/2007 | Goffin | G06K 9/00288 |
| | | | | 382/118 |
| 2008/0092155 | A1 * | 4/2008 | Ferrone | H04N 21/25883 |
| | | | | 725/9 |
| 2008/0092156 | A1 * | 4/2008 | Ferrone | H04H 60/33 |
| | | | | 725/13 |
| 2008/0141317 | A1 * | 6/2008 | Radloff | H04N 5/44582 |
| | | | | 725/87 |
| 2009/0019487 | A1 * | 1/2009 | Kulas | H04N 5/44543 |
| | | | | 725/41 |
| 2009/0043593 | A1 * | 2/2009 | Herbrich | G06Q 10/04 |
| | | | | 705/318 |
| 2009/0100094 | A1 * | 4/2009 | Verdaguer | G06F 17/30828 |
| 2009/0133078 | A1 * | 5/2009 | Hamano | H04N 5/76 |
| | | | | 725/87 |
| 2009/0138805 | A1 * | 5/2009 | Hildreth | G06K 9/00335 |
| | | | | 715/745 |
| 2009/0276805 | A1 * | 11/2009 | Andrews, II | G06Q 30/02 |
| | | | | 725/35 |
| 2009/0282093 | A1 | 11/2009 | Allard et al. | |
| 2009/0328122 | A1 * | 12/2009 | Amento | H04N 7/17318 |
| | | | | 725/114 |
| 2010/0017474 | A1 * | 1/2010 | Kandekar | H04N 7/17318 |
| | | | | 709/205 |
| 2010/0088726 | A1 * | 4/2010 | Curtis | G11B 27/034 |
| | | | | 725/45 |
| 2010/0153885 | A1 * | 6/2010 | Yates | G06F 3/0482 |
| | | | | 715/841 |
| 2010/0205628 | A1 * | 8/2010 | Davis | H04M 1/72533 |
| | | | | 725/25 |
| 2010/0211439 | A1 * | 8/2010 | Marci | H04N 21/84 |
| | | | | 705/7.29 |
| 2010/0281509 | A1 * | 11/2010 | Yu | H04N 7/17336 |
| | | | | 725/100 |
| 2011/0008019 | A1 | 1/2011 | Hirano | |
| 2011/0016479 | A1 * | 1/2011 | Tidwell | G06Q 30/02 |
| | | | | 725/9 |
| 2011/0069940 | A1 * | 3/2011 | Shimy | G11B 27/105 |
| | | | | 386/296 |
| 2011/0072452 | A1 * | 3/2011 | Shimy | H04N 7/163 |
| | | | | 725/25 |
| 2011/0078731 | A1 * | 3/2011 | Nishimura | G06F 9/4446 |
| | | | | 725/39 |
| 2011/0112890 | A1 * | 5/2011 | Chu | G06Q 30/02 |
| | | | | 705/7.33 |
| 2011/0184778 | A1 * | 7/2011 | Graepel | G06N 7/005 |
| | | | | 705/7.31 |
| 2011/0185437 | A1 * | 7/2011 | Tran | H04L 63/104 |
| | | | | 726/28 |
| 2011/0237324 | A1 * | 9/2011 | Clavin | G06K 9/00369 |
| | | | | 463/29 |
| 2011/0246285 | A1 * | 10/2011 | Ratnaparkhi | G06Q 30/00 |
| | | | | 705/14.42 |
| 2011/0295693 | A1 * | 12/2011 | Clavin | G06Q 30/0269 |
| | | | | 705/14.66 |
| 2012/0060176 | A1 * | 3/2012 | Chai | H04H 60/45 |
| | | | | 725/10 |
| 2012/0131098 | A1 | 5/2012 | Wood et al. | |
| 2012/0154557 | A1 * | 6/2012 | Perez | H04N 21/25891 |
| | | | | 348/53 |
| 2012/0174159 | A1 * | 7/2012 | Arte | H04N 21/2668 |
| | | | | 725/46 |
| 2012/0201255 | A1 * | 8/2012 | Manor | H04N 21/2385 |
| | | | | 370/468 |
| 2013/0024775 | A1 * | 1/2013 | Miyazaki | G06F 3/0484 |
| | | | | 715/733 |
| 2013/0027613 | A1 * | 1/2013 | Kim | H04N 21/4126 |
| | | | | 348/563 |

(56) References Cited

U.S. PATENT DOCUMENTS

| | | | | |
|---|---|---|---|---|
| 2013/0036200 A1* | 2/2013 | Roberts | .............. | H04L 65/4076 709/219 |
| 2013/0067513 A1* | 3/2013 | Takami | ................ | G06Q 30/02 725/34 |
| 2013/0086602 A1* | 4/2013 | Mikan | .................... | H04L 67/24 725/10 |
| 2013/0091515 A1* | 4/2013 | Sakata | ................... | H04N 17/04 725/10 |
| 2013/0173765 A1* | 7/2013 | Korbecki | ......... | H04N 21/42209 709/221 |
| 2013/0219417 A1* | 8/2013 | Gilson | ................ | H04N 21/258 725/12 |
| 2013/0231189 A1* | 9/2013 | Beeler | .................... | A63F 13/65 463/42 |
| 2013/0298146 A1* | 11/2013 | Conrad | ............... | H04N 21/252 725/12 |
| 2013/0330055 A1* | 12/2013 | Zimmermann | ......... | G06F 16/78 386/240 |
| 2013/0332965 A1* | 12/2013 | Seyller | ................ | H04N 21/252 725/61 |
| 2014/0067828 A1* | 3/2014 | Archibong | .......... | H04L 65/4084 707/748 |
| 2015/0068069 A1* | 3/2015 | Tran | ....................... | H04B 1/385 36/136 |
| 2015/0296250 A1* | 10/2015 | Casper | ............... | H04N 21/4316 725/34 |
| 2016/0381427 A1* | 12/2016 | Taylor | ................... | G06Q 30/00 725/13 |

* cited by examiner

MULTI-MEDIA PRESENTATION SYSTEM

The present disclosure claims priority to U.S. Provisional Patent Application Ser. No. 61/773,806, filed Mar. 6, 2013.

BACKGROUND

The present disclosure relates generally to systems, methods and devices to deliver customized and responsive multi-media presentations, art or morphed reproductions of the environment or data inputs, and to synthesized data or analysis of the data inputs that represents a responsive interpretation. More particularly, the present disclosure relates to dynamic creation of an art form combined from real-time environmental variables, saved selections and favorites coded to an identified viewer, and this combination is then further formatted with matched archetypal artistic designs and stratagems.

In general, there have been many attempts to automate the creation of art. Systems for collection and interpretation of data are successful in manipulating financial numbers or visualizing terrain features, but are quite regimented.

Some programs provide a tool for viewers to alter images or to adapt images to the format of specialized devices such as mobile phones. There is corresponding activity to create the same tools for auditory recordings, to merge auditory data with visual data or synchronize or alter their timing. In most cases these tools provide simple yet standard methods for a viewer to crop or easily format pictures for upload, or to morph a picture with a distortion effect such as stretching a face or adding comic sunglasses, or to similarly select an entire sound segment by the start and stop of where the decibel level is zero (absent).

A more complex example is Deutscher et al's U.S. patent application Ser. No. 10/183,830 (Publication US 2004/0001106 A1) that describes a presentation system to organize objects into one directory for ease of selection by a viewer; however, the editing tool does not initially load the data files nor create a finished and responsive presentation without the viewer manipulation.

Another example is Foote et al's U.S. Pat. No. 7,383,509 B2 that describes a system to parse the visual and auditory elements of a data into a multi-media presentation. Such a system edits and economizes the data used but does not incorporate data input beyond the file provided or provide a response and input method for the viewer to influence the presentation.

Yet another example is Abujbara et al's U.S. Pat. No. 8,230,344 B2 that enables identification of an individual in an image and then to search and select images that contain that individual for combination into a multi-media presentation. Again, this example does not incorporate data of the individual or individual's environment nor provide a response and input method for the viewer.

Tools to search words, phrases and topics, based on semantic definitions, have been described and used for online search engines. An example is Omoigui's U.S. patent application Ser. No. 10/781,053 (Publication US 2004/0230572 A1) that describes retrieval of information semantically related to a term or phrase, generally described by Omoigui as information, and then presenting the information in a list for review and further selection by a viewer.

Further, machines have been created as an attempt to generate art, or as a test of a machine's ability to create an entertaining or significant expression as compared to what can be created by a human. An example would be a robot that randomly paints lines in different colors on a sketchpad, without a predetermined pattern but pre-programmed with the bordering dimensions of the pad as constraints.

Another example is Lee et al's U.S. patent application Ser. No. 11/583,776 (Publication US 2007/0101251 A1) that describes a system to create a dynamic image object by arranging image objects according to a template. The multi-media presentation system described in Lee's patent application requires the viewer to select the objects to be used ahead of initiating the program, and therefore does not have a method to evaluate the relative importance of these objects or highlight some objects relative to others in the presentation; nor does the multi-media presentation system have any method to gain response from the viewer and adjust automatically.

More typically, there is a very simplistic paradigm used as software that manipulates images in response to one variable, such that the result might be construed more as gimmick or novelty than judged as art. A simple form would be a "mood ring" that changes color according to the temperature of touch, although temperature is a poor ruse for actual mood.

Another example would be Schug's U.S. patent application Ser. No. 09/325,386 (Publication Notice US 2002/0021288 A1), which discloses an art form display that manipulates the lightness of an image based on the amount of ambient light or to propagate an image to show progression in sequence with the time of day.

Artistic expression by its nature presents new and unusual information of interest to the viewer, combining unknown content or combining the known in new, unforeseen ways that interest the viewer. Therefore the prior art described that which takes known objects and combines them in known ways are "unartistic" and simply tools for a human to input the artistic novelty.

The market for multi-media presentation is primarily populated with tools to automate the collection and ranking of data, or suggest an initial editing of data so that a viewer, the artist, can accept or intervene to further manipulate that data to the viewer's liking. Those tools responsive to the environment present gimmicks that change the intensity of sound, light or color within a presentation according to a single variable, such as temperature, light or sound; the pre-programmed link of environmental variable to presentation response is by its nature rigid, known and unresponsive to viewer preference, so that ultimately these tools also have minimal significance to the viewer.

SUMMARY

In general, the multi-media presentation system according to one disclosed non-limiting embodiment generally includes a storage subsystem, a display subsystem, a server subsystem, an input subsystem, and a backup storage subsystem for generation of a multi-media presentation that enables interactive viewer response. Data inputs can include: representation of a natural sensation of the viewer such as an image, auditory recording, touch, smell, or taste; environmental readings, and measurements, such as video and audio recording from the proximity of the multi-media presentation system and from remote recording devices or from sources such as internet files, devices connected by the user to the multi-media presentation system through a computer port, such as weather gauges or measurements as provided through internet records, through light and color reading, devices; the identification and interpretations of human expressions such as viewer facial gestures, body movements, spoken words or corresponding feedback input through a keyboard or internet connection; data input can also include direct user or viewer input by touching the responsive and creative multi-media presentation screen, buttons, tactile devices or similar non-verbal or non-textual input provided through the internet or through a computer port; and text or social media from viewers or a remote viewer.

The multi-media presentation system utilizes methods to analyze data inputs, particularly to identify information that will be viewed as most popular by being most similar to the viewer, to a target preference or by being statistically different compared to the viewer and to what has been stored. The multi-media presentation system utilizes storage methods through hardware and software that permit the efficient storage of data, refresh of data to free storage space, and flexibility to alter the storage configuration as new data is analyzed. Archetypes of objects and of presentation organization schemes can be provided with the initial setup of the multi-media presentation system, but can also be created, modified or added as the multi-media presentation system operates over time. The multi-media presentation system operates to generate a multi-media presentation that is projected to be of most interest to the viewer. The multi-media presentation system takes it as given that the viewer is interested in itself and how others may perceive them.

The multi-media presentation system begins the responsive and creative multi-media presentation at start-up based on input collected from the environment of the responsive and creative multi-media presentation device, combined with any data pre-loaded to the multi-media presentation system, if present, and then formatted according to archetypal themes.

The responsive and creative multi-media presentation adjusts by collecting information found to be similar or different, through environmental inputs, search of internet sources, search of an external data store connected by the user through a computer port, and other inputs.

The multi-media presentation further adjusts according to feedback collected from the viewer as to what is analyzed to be most interesting, and analyzed according to the various input types described in this application whether inadvertently provided by the viewer such as sounds, facial gestures and movements, and approach or withdrawal, or deliberately provided by the viewer such as spoken words, responses on controls like a touchscreen or input sent via the internet.

In another disclosed non-limiting embodiment, the multi-media presentation system can serve as an educational or information gathering device, by learning what interests the owner, a viewer or group actively searching information that is related but also new, different, most popular or most significant, and for further refinement. In this embodiment, the multi-media presentation system can interpret news events according to a schema that is most interesting to the viewer as learned over time, and integrate the news into a presentation in a most engaging manner. The multi-media presentation system can use paradigms to identify significant news or information to include such as matching key words, counting citations or references, or reacting to other cues such as red colors, importance of speaker's title or matching a pre-loaded list of sources. The multi-media presentation system can also search content such as from educational sources, particularly when the multi-media presentation system is active but the viewer is not present, to integrate new and more detailed information to the returning viewer. The multi-media presentation system can be set to search for content during hours when the system is not likely to be viewed, or when the system has not been viewed within a set period of time as determined for example by proximity interrupts, or to favor the search, selection and storage of content as data files during periods when the viewer is not present, so as to optimize the performance and responsiveness of the system. The multi-media presentation system can select only information found to be new or different from the previous time period when a viewer was engaged or from a set time period on a regular basis, such as, for example, from midnight of the preceding day to show news from overnight.

In another disclosed non-limiting alternate embodiment, the viewer of the multi-media presentation system can control the general tone or intent of the analysis and presentation, so that, for example, the multi-media presentation is more uplifting or motivational.

The multi-media presentation system can also include a control screen or administrative panel where the user can set variables for the collection, analysis, storage and presentation, such that the resulting system matches more closely the user's desired effect. As an example, a mother might desire that the early morning presentation from the device would be sunny and affirmative to motivate her children towards accomplishment at school, while an athlete or coach might desire that the responsive and creative multi-media presentation be strong, competitive and oriented to success so that the player and team can focus on an upcoming game, while a church pastor might desire that the responsive and creative multi-media presentation be more serene and meditative and also that the responsive and creative multi-media presentation have greater permanence for its historical record compared to new information so as to augment the sanctuary provided. The multi-media presentation system may be adjusted or coded by a viewer acting as administrator to select or add program applications and/or data that will make the system function more ideally for specific applications of the system. The multi-media presentation may be pre-loaded with input paradigms that permit a viewer, particularly a first time viewer, to provide preference information that will set favored themes and routines that can be selected by the system or reallocated to the central storage of the system for primary review and selection. As example, the system may have a startup routine in a menu that presents the viewer with pairs of images, sounds and text words, and from the selection by the viewer for each of these pairs, the system determines the viewer's most favored colors, themes, artists, subjects, demographics and interests.

The multi-media presentation system may also be in place of an alarm clock or incorporated with alarm systems, for example to gently raise the level of noise and light and provide a more pleasurable waking experience, or be incorporated with timing devices to start and stop at set times, for a set duration or an accumulated duration. The multi-media presentation system may, for example, be provided within each luxury suite at a hotel to provide the premium benefit to a guest to customize their morning alarm or to transition the mood during set periods of time or during events of interest to the viewer.

The multi-media presentation system can be incorporated with any household appliance, manufacturing control system, or machinery where attraction, engagement or repulsion of the viewer is desired. For example, the multi-media presentation system may be incorporated with an oven or cooking appliance to ward or repulse children or pets while it is hot, and to attract the homeowner when the food preparation is complete or nearly complete; or incorporated with a lawnmower to maintain the operator's attendance and attention.

In another alternate embodiment, the user of the multi-media presentation system may be a corporate entity wishing to advertise, or a candidate or supporting sponsor group wishing to impart a political message. In this example, the user seeks to tailor the responsive and creative multi-media presentation to the viewer so that it will be more readily accepted but at the same time desires to maintain a position and tone that will support that product, service or candidate. In some instances this embodiment may even take a position and tone completely counter to an individual to call out a heckler or weak opponent to build rapport through humor or to strengthen the apparent position of the sponsor by demonstrating to the remainder of the viewer how the opposing position is weak.

In another disclosed alternate embodiment, the multi-media presentation system is integrated with a customer service response system to improve its effectiveness in engagement, viewer participation and satisfaction levels. Such a customer service system may be an auditory system heard on the phone, a multi-media presentation on a mobile device or on the internet, or even integrated into unconventional presentation devices such as a mannequin. The example auditory phone system may use the accent, tone and tempo matching to speech of the viewer, as if the viewer is talking to itself. The example mannequin may be giving a speech or singing and movements of body or facial parts, and start or adjust such actions when the viewer triggers the proximity interrupt to demonstrate recognition of the viewer, and then refine the responsive and creative multi-media presentation of stimuli output according to environmental inputs and viewer response. Such start or adjustment of actions include the viewer, for example reaching to touch the viewer, mirroring in speech or motion what the viewer is wearing or the appearance of the viewer, or mimicking other aspects of the viewer. Such a mannequin may also be collecting and storing viewer input for further analysis and use by an administrator or sponsor.

In another disclosed alternate embodiment, the multi-media presentation system is integrated with a toy for a pet so that the responsive and creative multi-media presentation continues to be engaging for the pet over time even when the human owners are not present. In this embodiment, the multi-media presentation system may present to the pet aspects of the owner as if the owner were present such as sounds, smells or other sensory cues that engage an animal for a specific amount of time each day. System inputs may be responsive to sensory cues that are perceptible to the viewer but not to humans, such as magnetic field or to pitch tones heard by dogs but not by humans, as example. The time period may be administered by an administrator of the multi-media presentation system such that the multi-media presentation system will exercise or amuse the animal at regular intervals. The multi-media presentation system may also be used with untamed creatures for such purposes as to collect information, gauge response where a human presence is impossible, would be difficult for extended time periods, or would interfere, or where the progressive presentation of stimuli to the creature or subsets of creatures will identify what is most engaging and increase interaction between the multi-media presentation system and creatures.

The embodiments may optimally include pre-loaded data, archetypes, statistical models, analytical methods, and methods for an administrator to input these elements in real-time or to integrate media directly from the administrator to the viewer so that the multi-media presentation is more effective and seamless from a live interaction. The multi-media system may be administered through a connected part of the system or through a remote connection such as the internet as it is being viewed or while it is not viewed from within the proximity of the system, so that another viewer or administrator can adjust the program routines, the presentation, collection or storage of data inputs and files, or general performance of the multi-media system, so as to improve the apparent responsiveness of the system, the performance of the system in real time or in the future, or to gain information about the performance of the system that will assist its development and performance.

Each or any of the embodiments may also include user identification methods to customize the multi-media presentation and actions of the multi-media presentation system, to support multiple user presentation versions within one system, to accommodate the relationship among different users for an optimal simultaneous presentation, and to provide an owner or administrator with segmented information according to users or user types.

The multi-media presentation system thereby delivers a multi-media presentation that will be of most interest to a viewer; gather data that will be most engaging and informative to the viewer; enable an advertisement or message associated with a tone, related concepts and methods that will have permanency even as the responsive and creative multi-media presentation adjusts other aspects to the environment and viewer; support customer service regimens with a presentation that can improve the effectiveness, improve efficiency for the sponsor, and gain input for an improved feedback system; and/or that which will engage, amuse or otherwise benefit creatures and humans, gain information about the creatures and their behavior, and improve understanding of how future systems may benefit our relationship with creatures.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
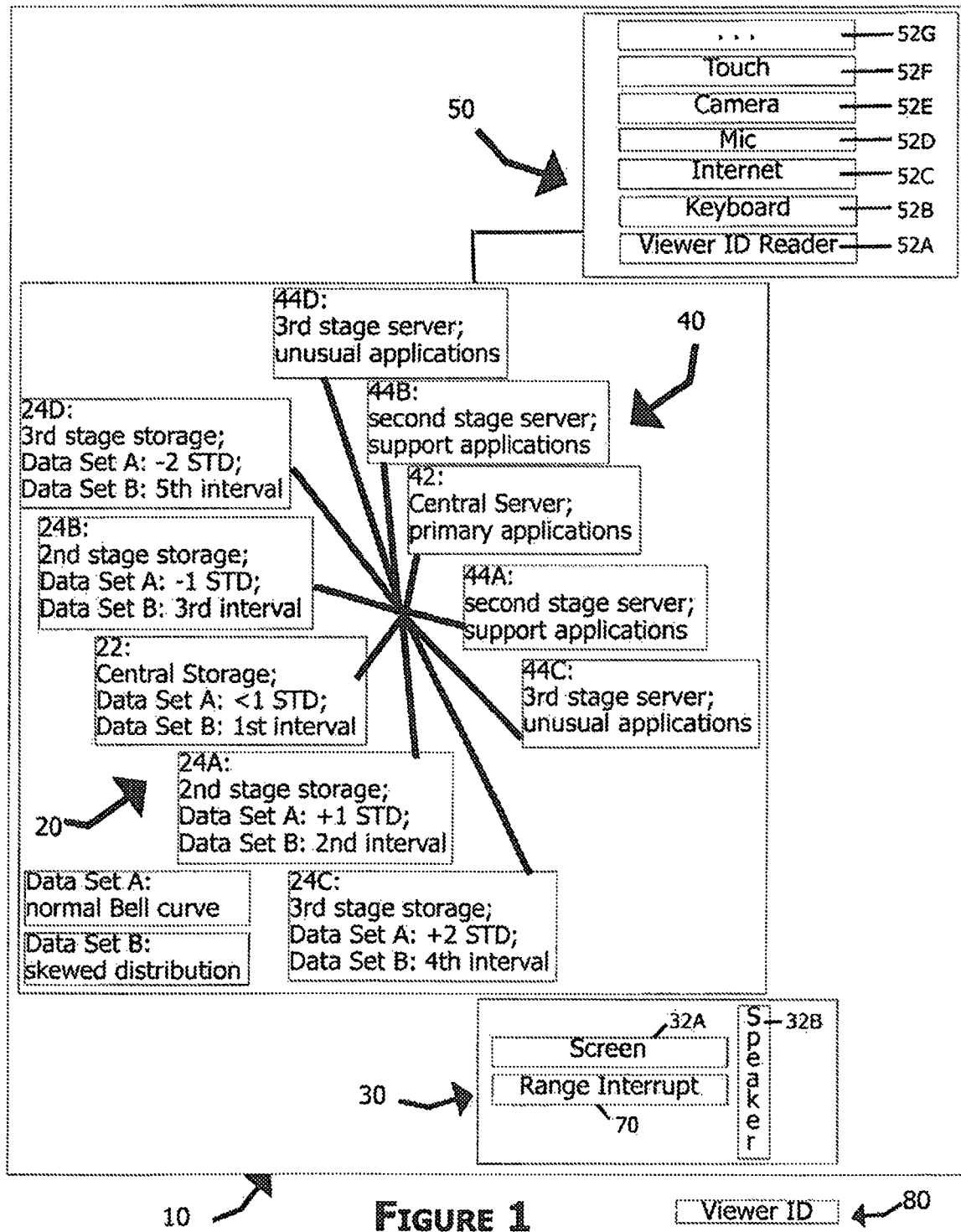
FIG. 1 is a schematic depiction of the responsive and creative multi-media presentation system according to one disclosed non-limiting embodiment.

FIG. 1 schematically illustrates a multi-media presentation system 10 that generates a responsive and creative multi-media presentation to a viewer. It should be appreciated that the viewer can be an individual, creature, group of individuals, group of creatures, corporate entity, legal entity, government entity, sponsor or other entity.

The multi-media presentation system 10 generally includes a storage subsystem 20, a display subsystem 30, a server subsystem 40, an input subsystem 50, and a backup storage subsystem 60. It is a perspective that at the current time, physically discreet elements of the subsystems will accelerate access and performance that will enable the system to create and respond to viewers within acceptable time intervals. It should be appreciated that although particular subsystems are separately defined, each or any of the subsystems may be otherwise combined or segregated via hardware and/or software. It is possible to create such a version of the multi-media presentation system 10 through virtual server partitions and virtual storage partitions that will deliver functionality even if suboptimal.

The storage subsystem 20 includes a central storage device 22 and a multiple of secondary storage devices (four shown) 24A-24D that contain data in statistical distributions. There are a multitude of models and paradigms to analyze the distribution of data, characterize it according to defined distribution patterns, and assign the data to intervals described by the pattern. It is possible within the multi-media presentation system 10 to assign data of different sets and patterns to the same storage devices in different configurations. The central storage device 22 is operable to store the most likely or favorite archetypes or artistic schemes for presentation, while secondary or less favorable or undesirable schemes are stored in the other storage devices 24A-24D.

The storage device 24A-24D store, for example, an archive of favorites and preferences created from averages of data and the archetypes of artistic composition and statistical models. Alternatively, or in addition to the bell curve distribution, a skewed model or other distribution may be found to be most representative of the distribution to more accurately tabulate the data.

Data Set A is arranged in a normal distribution of a bell curve with respect to the central storage device 22 and the secondary storage devices 24A-24D according to the standard deviation intervals of the data points; Simultaneous storage of data within Data Set B is arranged according to a skewed distribution pattern, where the data points within the $1^{st}$ interval of data most likely to occur is stored in central storage device 22 and the remaining intervals 2 through 5 are stored in the $2^{nd}$ stage and $3^{rd}$ stage storage devices 24A-24D respectively. When data points are unique within a distribution interval or represent the more representative, average or endpoint of a data set, then that data point can be retained as a file, while other data points that are duplicative or similar enough to other data points, averages or endpoints can be simply tabulated for representation and the data file discarded to make the storage more efficient. Other statistical models, such as a bimodal distribution, may have detail of the model stored within the non-central secondary storage devices 24A-24D, and when the data points that fit this model are stored, the data points or representation of the data points within the most populated intervals will be maintained within the central storage device 22 while the secondary storage devices 24A-24D are used to store the data points or representations within the less common intervals.

The central storage device 22 is operable to store the most likely or favorite archetypes or artistic schemes for presentation, while secondary or less favorable or undesirable schemes are stored in the other storage devices. The storage devices 24A-24D may be utilized to segregate data to correspond to predetermined standard deviations of data. For example, storage devices 24A and 24B store data by more than plus or minus one standard deviation but less than plus or minus two standard deviations while storage devices 24C and 24D store data larger by more than plus or minus two standard deviations.

The multi-media presentation system 10 begins the responsive and creative multi-media presentation at start-up based on input acquired from the environment of the multi-media presentation system 10, combined with any acquired data in the central storage subsystem 20, if present, and then organizes the data according to archetypal themes.

As new data is encountered, the data is compared to preferences in the central storage device 22 to determine where the data point is to be stored, and if statistically different than the central data, the new data is stored in one of these other storage subsystems. If using a basic bell curve distribution and the difference between this new data and the preference is less than one standard deviation then the data is tabulated into the central storage device 22. Furthermore, if the new data point is statistically similar to a data point already stored then the new data point is tabulated but not retained. Alternatively, if the new data is determined to be less on a critical dimension such as size or brightness by more than one standard deviation but within two standard deviations, then the rating is assigned to the file and it is placed in storage device 24C or 24D. The first file identified to be less by one standard deviation is placed in central storage device 22, but as new files are identified to be closer to the center of this standard deviation set, or at the border of standard deviations, then these new files are retained and the first file may be discarded except for the tabulation. The tabulations will serve to adjust the statistical distributions while the files retained will save representative sets for quick access. The statistical models stored in the central storage device 22 will then be adjusted.

Alternatively, one or more central storage devices 22 may be partitioned into several units, to, for example, facilitate effective recovery from storage device errors, but creation of these virtual storage subsystem partitions serves essentially the same purpose. Alternatively, multi-partitioned storage may be located in a mobile type device or facilitate connection to internet storage. The storage subsystem 20 may be of various data device types such as onboard and off board storage to include but not be limited to SAN, NAS, gb, flash drive, cloud storage, etc.

During idle periods, which, for example, may be primarily after a viewer has left the field of view of the display subsystem 30 or during times of day when viewers are least likely to view the system, the multi-media presentation system 10 may move data to the backup storage subsystem 38 and defragment storage devices 24A-24D. This will reset the central storage subsystem for increased "real time" processing. The data in the backup storage subsystem 38 can then be re-evaluated and reformatted before loading into the central storage device 22 and secondary storage 24A-24D to facilitate rapid access. The multi-media presentation system can be set to perform such operations during such idle periods or to favor the performance of such operations during such idle periods compared to other periods when the system is viewed.

The server subsystem 40 is generally one or more processor and application combinations to operate the multi-media presentation system 10. The server subsystem 40 according to one disclosed non-limiting embodiment includes a central server 42 and a multiple of secondary servers (four shown) 44A-44D that may be associated with the respective central storage device 22 and the multiple of secondary storage devices 24A-24D of the storage subsystem 20 for communication therewith. The functions of the server subsystem 40 may be disclosed herein in terms of block diagrams and it should be appreciated by those skilled in the art with the benefit of this disclosure that these functions may be enacted in either dedicated hardware circuitry or programmed software routines capable of execution in a microprocessor based electronics control embodiment. That is, the server subsystem 40 is primarily aligned as the processor for the multi-media presentation system 10 with, for example, permanent storage and RAM to run applications while the storage subsystem 20 is generally a much more extensive and often separated data structure of files in communication with the server subsystem 40. While it is advantageous to have a central server 42 load the most frequently used or critical applications, archetypes, etc., from the storage subsystem 20 into RAM and process directly, and the secondary servers 44A-44D load less frequently used or non-critical applications from the storage subsystem 20 into their respective RAM for direct process, it is possible to use any combination of discrete or virtual server storage without altering the intent of the invention. Those skilled in the art will appreciate, for example, that specific applications may be pre-loaded to the discrete server units of central server 42 and secondary servers 44A-44D for direct access, various combinations of storage, access and processing of applications, data and files from storage subsystem 20, physical or virtual, will also benefit therefrom.

The server subsystem 40 is in communication with the input subsystem 50 that may include a multiple of input devices, such as a viewer-identifier reader 52A, a keyboard 52B, internet connection 52C, microphone 52D, camera 52E, touch screen 52F or other device 52G. It should be appreciated that the input devices may be located and/or displayed by the display subsystem 30. That is, the interfaces may be virtual. It should be appreciated that it is also possible to connect a variety of remote input devices through the internet or other connections. The server subsystem 40 accesses preferences and statistical models in the central storage device 22 to determine whether and where to store data from the input subsystem 50, and whether to include the data in whole, part, or with what change in the responsive and creative multi-media presentation shown in the display subsystem 30.

In one disclosed non-limiting embodiment, the display subsystem 30 is essentially a wall mounted flat-screen type display; however, it will be appreciated that there are a multitude of visual and auditory projection devices including free standing and mobile devices with various hardware, mechanical, or electrical configurations and capabilities. The display subsystem 30 may include a screen 32A and speakers 32B as is typical of a flat panel type display, mobile device or other such system.

The display subsystem 30 further includes a range interrupt device 70 to provide a view complementary to the viewable distance of the display subsystem 30. The range interrupt device 70 may include various sensors operable to identify a viewer. The range interrupt device 70 may include more than one sensor with different range sensitivity, so as to determine the approach, retreat or general movement of a viewer. Identification by the multi-media presentation system 10 in one disclosed non-limiting embodiment may be unassisted by the viewer such that the viewer need not take any active steps to provide input. It should also be appreciated that the information as depicted to be presented need not be dependent on the types of inputs as depicted, nor of the type of information limited to the senses as depicted.

The range interrupt device 70 is operable to, for example, identify data about a viewer within the unassisted data input range of the viewer such that the server subsystem 20 of presentation system 10 is operable to analyze the relative significance of data across diverse types of inputs, modify the collection and analysis of data in response to viewer input, and format the data within the storage subsystem 40 to display a presentation that will be of most interest to the identified viewer.

The range interrupt device 70 may include programs for object recognition or facial recognition, technology to identify the outline of a person's silhouette from background information, a face from partial information of eyes and mouth, an object such as an eye within the broader pattern of a face, definition of objects separate from their environment and to isolate images for representation. The range interrupt device 70 may also be utilized to identify if more than one person or creature is present and to identify the specific individual or creature. The range interrupt device 70 can alternatively identify that a viewer has come into range without identifying the identity of the viewer such that the multi-media presentation system 10 defaults to a more generic presentation.

The range interrupt device 70 may be triggered by facial features or other identifying features of a particular person or group of viewers that is a particular target thereof. In one example, the multi-media presentation system 10 is utilized to convey a message to a particular person, to gauge the reaction of particular viewers to a presentation; or to record information about or from a particular person or group of viewers. For example, the image or identifying information of that particular person or group of viewers may be stored in the central storage device 22 while the inconsistent data collected is not stored at all, or is used for viewers who match a high percentage of variables as nearly within the group but not defined as part of the group, or is used for viewers analyzed to be most different from the group. As another example, the multi-media presentation system 10 may be operable to search for a particular suspect by enticing likely suspects to visit a location that is monitored. In this example, the storage subsystem 20 may store features of the suspect such as a measurement of the eyes in proportion to the face as given by a witness drawing such that without knowing the exact face, the multi-media presentation system 10 delivers a different presentation to particular viewers that fall within a tolerance range of that measurement. The multi-media presentation system 10 may then record interactions by such suspects.

Figure 2:
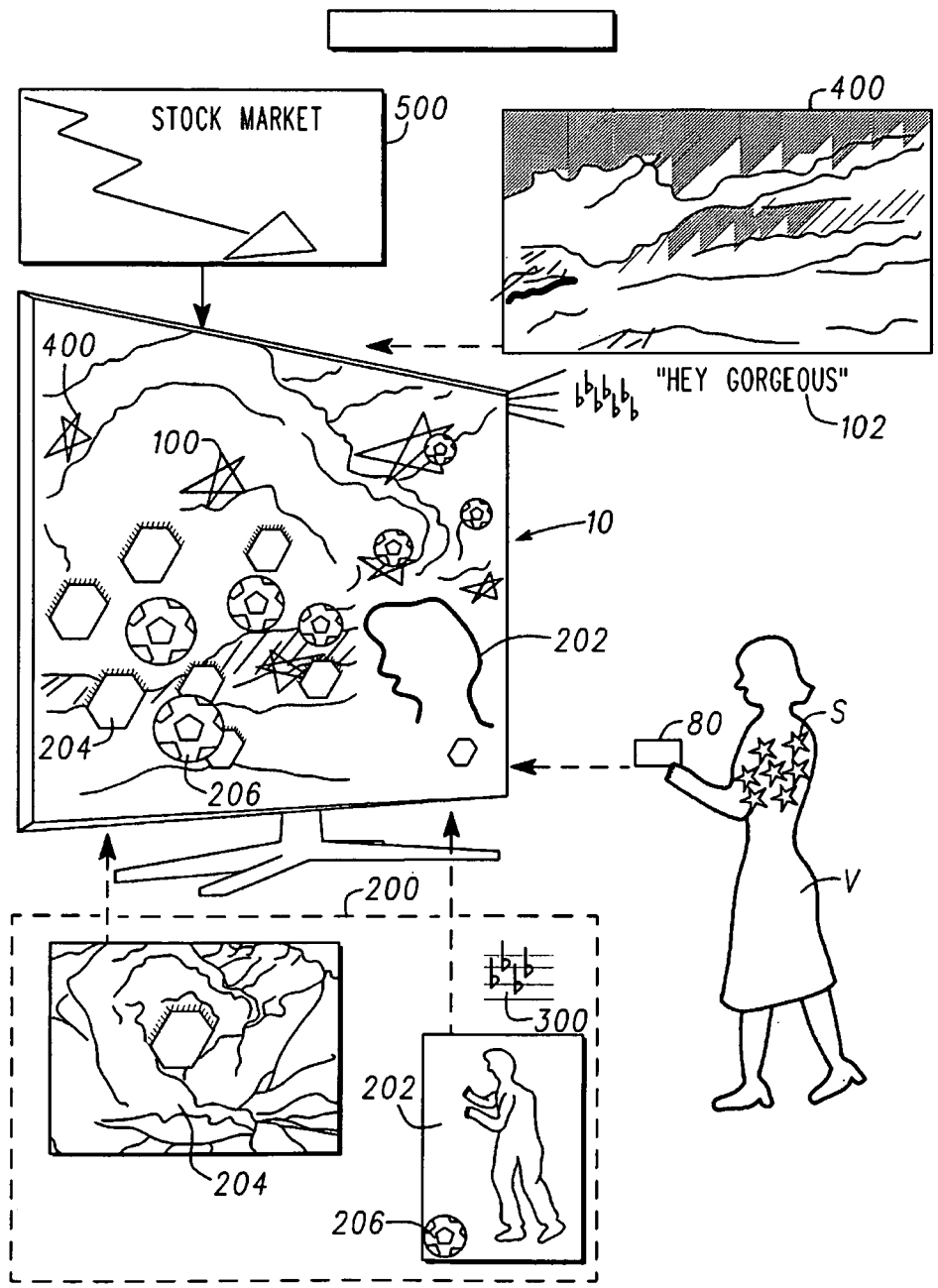
FIG. 2 is a schematic depiction of the processing and storage scheme.

The range interrupt device 70 in one disclosed non-limiting embodiment, may alternatively or additionally interface with, or otherwise recognize, a viewer-identifier 80 either passively or actively to enable the multi-media presentation system 10 to facilitate a customized and responsive presentation in response to unassisted data input of the viewer (FIG. 2). As defined herein, "unassisted data input of a viewer" refers to data collected about the viewer without the viewer providing active input such as keyboard input, touching a device to give a reading, communicating commands such as by speech, or transmitting other medical information via a device. Further, "the natural, unaided sensing range of a viewer" may be that which the viewer could be seen by the naked eye, heard by the unaided human ear, touched, or smelled as well as corresponding ranges where a creature is the viewer and could use one its sensory organs to sense one of its kind. In other words, the range interrupt device generally corresponds with a range at which a viewer can interact with the display subsystem 30.

The viewer-identifier 80 may be of various types, including but not limited to, RFID cards, phone numbers or identifying codes, spoken code words, or facial features and fingerprints that are physical holders of identifying information. The viewer-identifier 80 may also be that which is typically worn by an employee whether in the presence of the active multi-media presentation system 10, or not, to provide passive unassisted identification such as an access badge. The viewer-identifier 80 may also be, for example, a mobile device with video inputs, auditory inputs, viewer-identification, and tactile (vibration) interfaces. Various responsive features may be captured, and the mobile device can access a central server available through the internet to make the multi-media presentation system 10 available to individuals at low or no cost as an app (application) in return for receiving a mixed advertising message.

With reference to FIG. 2, the multi-media presentation system 10 may utilize object recognition software to identify the most striking patterns, color or object, illustrated here for example, as a star pattern on the clothing of a viewer. The multi-media presentation system 10 then reflects the identified pattern 100, color or object, onto the display subsystem 30 along with an audible attractor messages 102 appropriate for the viewer such as, for example, "Good Morning", "Hey you", "Hey gorgeous", "Hey handsome" selected according to, for example, the age, gender or other characteristic of the viewer. These elements personalize the responsive and creative multi-media presentation and integrate the viewer into the presentation. In another example, if a skateboarder comes within range of the multi-media presentation system 10 and performs a quick action trick, the multi-media presentation system 10 presents a competitive tournament clip as a more extreme example, or presents a young kid doing a basic trick and asking the viewer to do it again . . . . "Can you show me how to do that?" or as contrasting theme, presents an elderly librarian who tries to scold the viewer (in a humorous way)—"you are going to hurt yourself. You should sit down and read a book."

The multi-media presentation system 10 may further incorporate data from an archive 200 of images, messages, sounds, etc., pre-loaded into the storage subsystem 20, which may be a random selection from all data available, a select list of favorites, or a select list of recent additions. If the viewer is identified individually, then the multi-media presentation system 10 may select from an archive of data added by the particular viewer or by associates of the viewer.

The multi-media presentation system 10 may further present background stimuli from an external input 400 such as the video capture of the outside sky, e.g., sunset, sunrise, storm, etc. Any of such external data sources may serve a similar purpose, including remote internet images, translating the time of day into a favorite archival image of a sunset, translating the time of day into a bird call, or translating an internet data source that indicates-rain into an audio file that simulates raindrops. For this example the sunset is captured and shown in motion as background on the display subsystem 30.

Alternatively, or in addition, the multi-media presentation system 10 may search a list of favorite internet sites or family websites, or an external data source such as a picture library, to see if new images or data exist that may be of more interest to the viewer. The multi-media presentation system 10 may utilize, for example, an object identifying system to extract all or part of image files identified, for example, on a website from the archive 200 for inclusion in the presentation. For example, pictures of a child 202 of the viewer are pulled from the archive 200.

The multi-media presentation system 10 permits the viewer to select a scheme to place on the central storage device 22 as the favored choice, or to solicit a sponsor and market a scheme promoting the perspective of that artist. As another example, a triangular composition along with a contrasting color scheme may be the preferred composition archetype. Alternatively, or in addition, the multi-media presentation system 10 may tailor the color presented on the display subsystem 30 such as an orange color of the sunset as a prototypical image. Then, based on this orange color, the multi-media presentation system 10 selects an image from the archive 200 that includes a concentration of orange color. Alternatively, a contrasting color such as purple with straight and sharp edges may be selected as most different if similar items are not found within a set time period, the first inputs were analyzed to be discordant, or the viewers had previously shown preference for action and discord.

The multi-media presentation system 10 may further identify a curved edge of the clouds from the external input 400 and search for curved edges in the archive 200. The multimedia system 10 then selects this curved portion of the archival image and merges this selection with the background sunset for a similar orange, curved shape. In this example, the multi-media presentation system 10 utilizes a similar color and shape as most consistent with the positive aspects of the data inputs accessed to this point, or possibly due to the learned preference of the identified viewers for positive themes.

A secondary archetype using a saturated color scheme of all one color range, and a composition using the rule of thirds that places subjects at the points of intersection where lines drawn at intervals of one third across the frame, may be placed on the different storage devices as a less favored scheme to use. As another example, the archetype on central storage device 22 could favor saturated colors, certain subjects, compositions and colors as the "Georgia O'Keefe" version. Alternatively still, the archetype on central storage device 22 could emphasize primary colors and whimsical shapes that appear and grow from anywhere and replicate across the display subsystem 30 as the "Peter Max" version.

Alternatively, or in addition, the multi-media presentation system 10 may further incorporate news inputs 500, here depicted as a stock market decline. For example, news of a stock market decline analyzed to be discordant with the previous elements of the presentation, but not so different or noteworthy a news story from typical daily events that it should be emphasized in the responsive and creative multi-media presentation may be included in a minor way in terms of percentage of total display space and as an abstract rather than literal representation. Alternatively, instead of presenting a stock market chart, the multi-media presentation system 10 accesses the archive 200 and selects a graphic 204 of a contrasting shape and color, here depicted as a flower bud, then replicates the flower bud as content of different sizes declining from the left middle to lower right.

Alternatively, or in addition, the multi-media presentation system 10 may also mitigate that contrasting addition and return to a positive tone by access of the archive 200 and selection of an associated graphic 206 such as a soccer ball and replicate this associated object in a mirrored pattern from lower left to upper right.

If the news event is so negative or noteworthy as compared in contrast to a history of news events or through capture of key words such as "alert" or "breaking news", e.g. 9/11, then the entire presentation may be interrupted and recast with the news event as the central element and other data inputs, in response to data inputs of the viewer, processed and presented to support the noteworthiness thereof.

Alternatively, or in addition, the multi-media presentation system 10 may select an audio file 300 from the archive 200 that seems compatible with the composition, or can scan a data input feed such as radio receiver or live streaming source until the tone is analyzed to be compatible, and then transmitted though the speakers 32B of the display subsystem 30. Musical patterns also may reinforce what would be corresponding action and tone, and these elements can maintain permanence despite the temporary integration and intrusion of personal data inputs from the viewer or despite further selections by a viewer or multi-media presentation system 10.

In this example presentation, in addition to the sunset in motion across the display subsystem 30 and the music playing in the background, the multi-media presentation system 10 places graphics 204, and 206 in a sequence across the display subsystem 30 of the responsive and creative multi-media presentation, rather than as a static collection of images, to increase the dynamism of the responsive and creative multi-media presentation. To maintain the dynamism thereof, the multi-media presentation system 10 continues to search for alternate image data from the archive 200 and from external data sources to select graphics, pictures, colors and shapes from other or new images. Prior images can be diffused into new images that begin as small dots that grow in size and move to more critical spots of composition, or elements of highlighted images such as curves or corners can grow in size and color intensity, all as examples that make the responsive and creative multi-media presentation more dynamic. It should be appreciated that the multi-media presentation system 10 can engage viewers in a negative method as well as positive, so as to repel or deter behavior.

The viewers may also direct and/or select input via the viewer-identifier 80 or input subsystem 50. From that viewer input, the multi-media presentation system 10 is guided to further refine the images, sounds and data that are most likely to interest the viewer.

Figure 3:
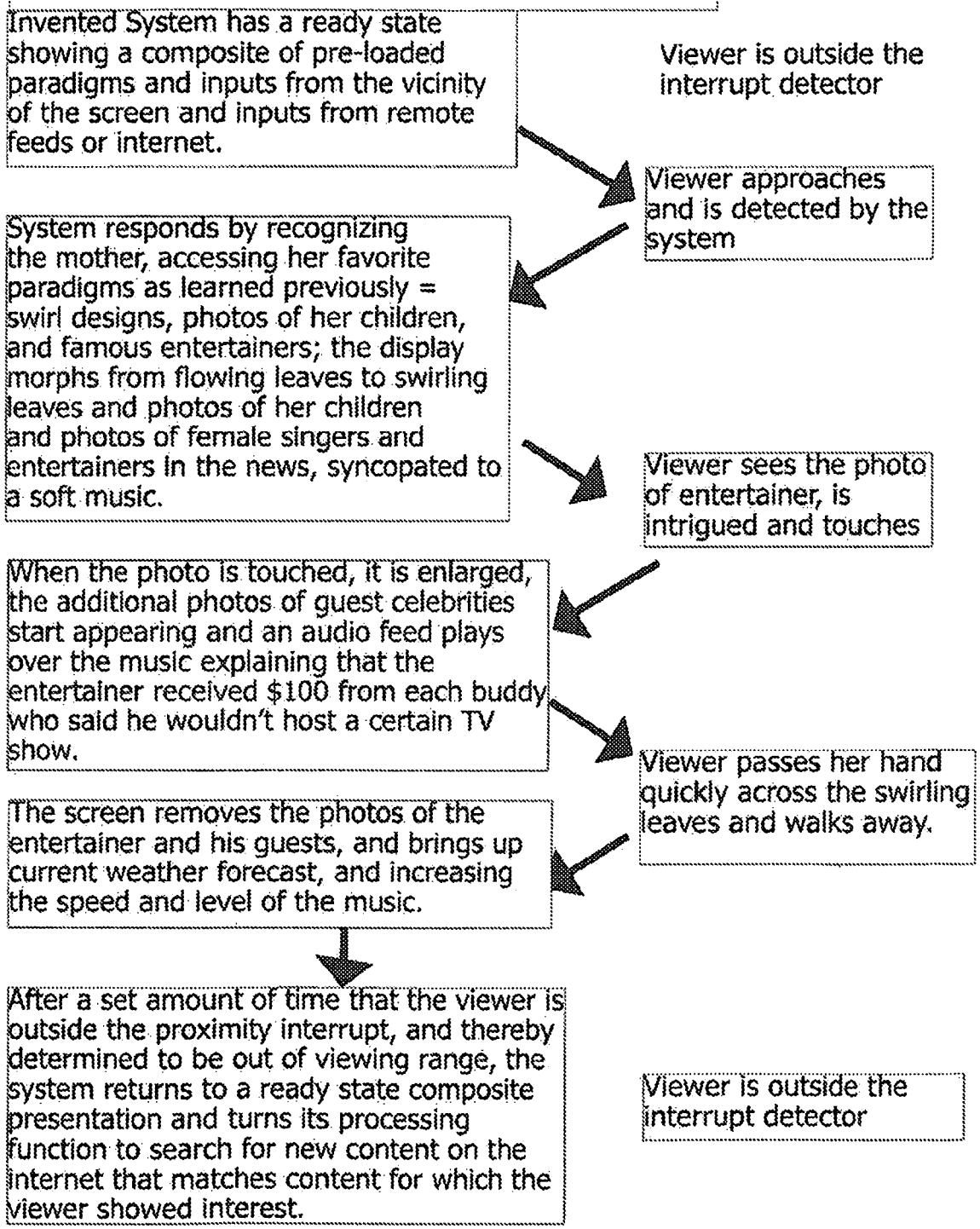
FIG. 3 is a schematic block diagram of one specific example of the multi-media presentation system in a home type environment.
Figure 4:
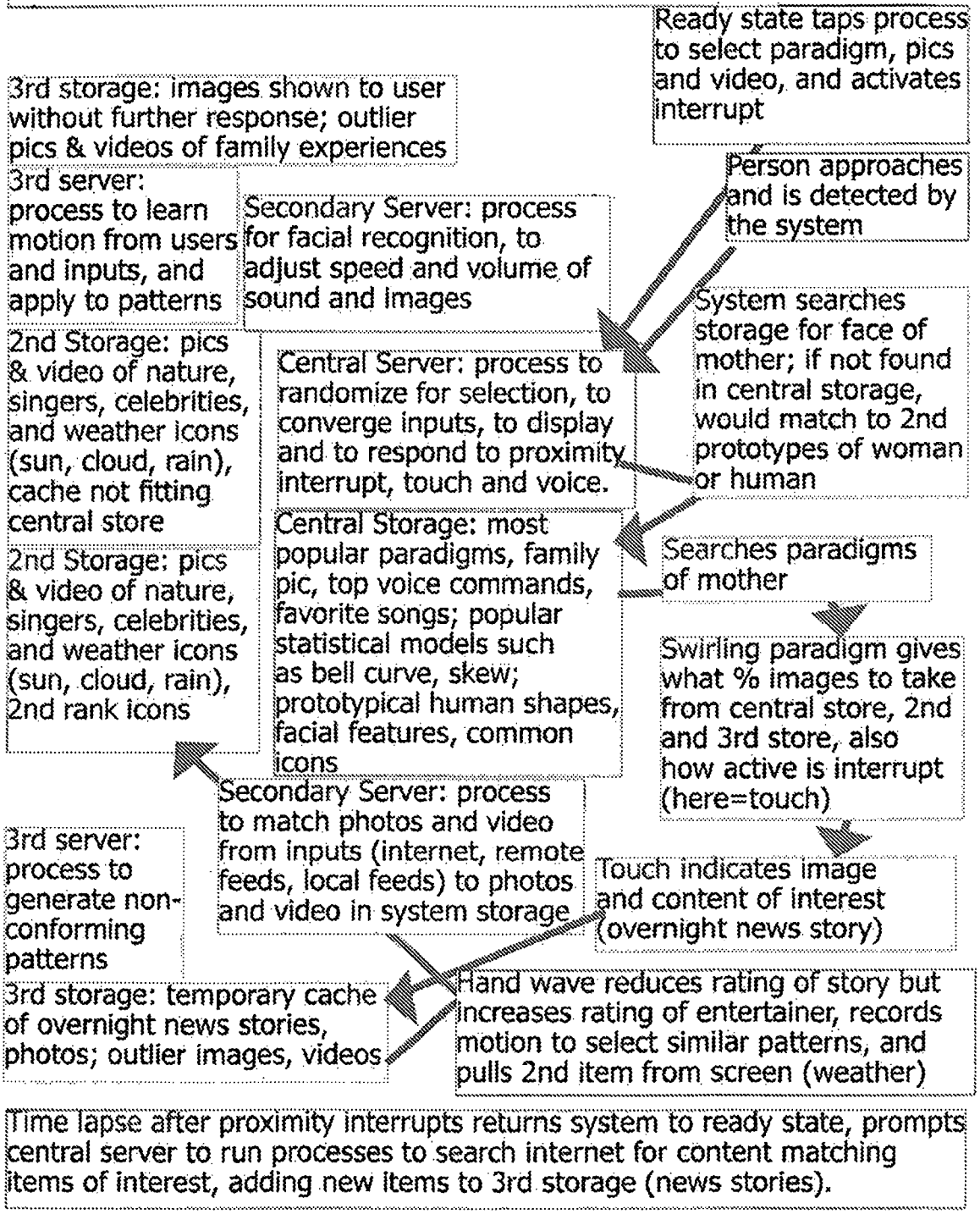
FIG. 4 is a schematic block diagram of one specific viewer process example of the multi-media presentation system in a home type environment.

With reference to FIGS. 3 and 4, one specific example of a responsive and creative multi-media presentation in a home type environment depicts viewer interaction (FIG. 3) and an associated system process (FIG. 4). It should be appreciated that this example is provided to illustrate a specific interaction by the viewer and should not be considered limiting as each viewer interaction may be different due to numerous variable such as time of day, time of year, current events, weather, moods, interactions, responses, etc.

Initially, the viewer is outside the range of the proximity interrupt device 70 and the responsive and creative multi-media presentation provides a visual of autumn leaves gently blowing across the display subsystem 30 according to the slight breeze outside, and reflecting the morning sun consistent with the 8:30 am local time. Then when a viewer approaches, the multi-media presentation system 10 operates to recognize the viewer as the mother of the house and thereby responds by accessing her favorite paradigms and archetypes as learned previously, e.g., swirl designs, pictures of her children, and famous entertainers (central storage device; FIG. 4). The responsive and creative multi-media presentation morphs from flowing leaves to swirling leaves and pictures of her children and pictures of female singers and her favorite personalities in the news syncopated to a desired soft music.

In this example, the mother sees the picture of the famous entertainer and touches the picture of the responsive and creative multi-media presentation. When touched, it is enlarged, and additional pictures of guest celebrities start appearing and an audio feed plays over the music explaining that the entertainer received $100 from each buddy who said he wouldn't host a particular television show.

Figure 5:
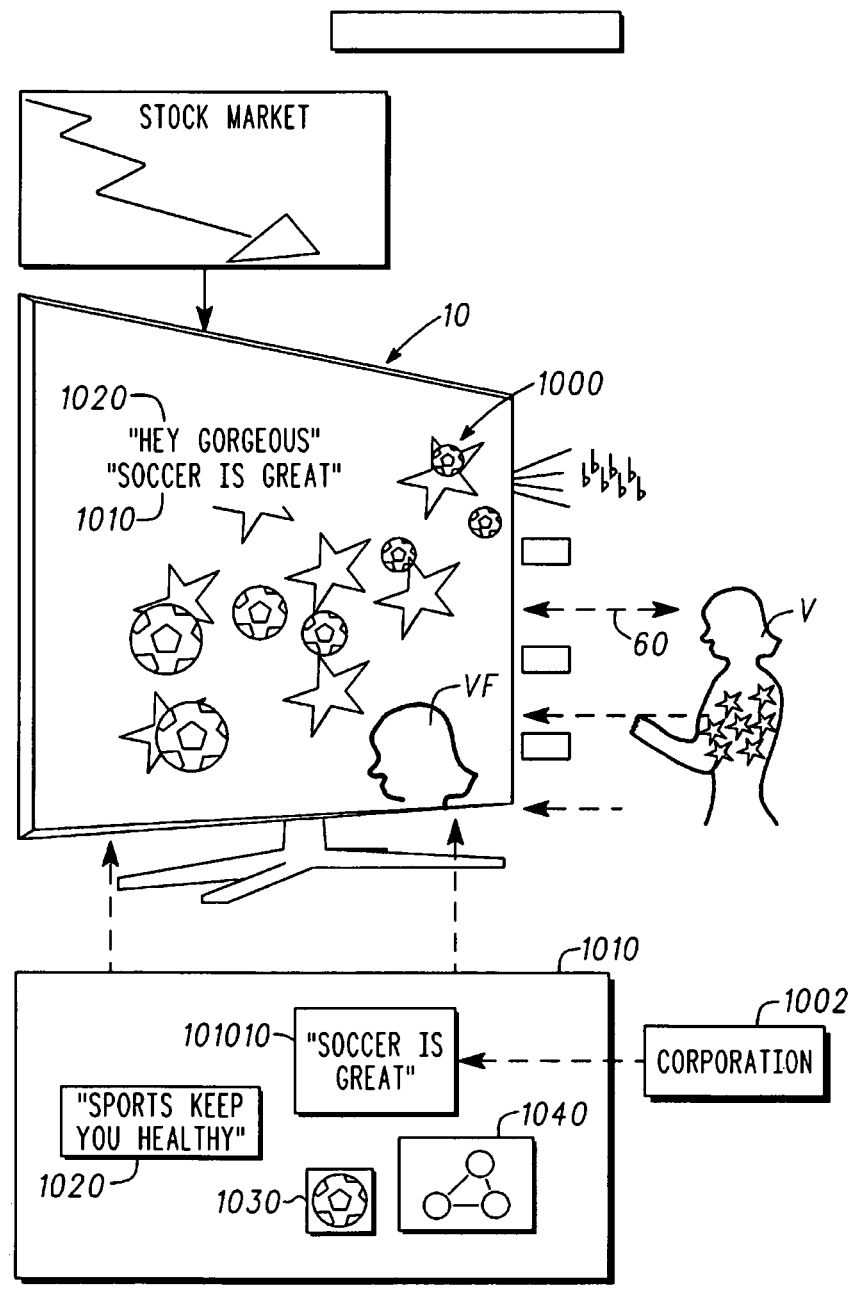
FIG. 5 is a schematic block diagram of a system process representative of data for the user process of FIG. 4.

The mother then swipes the swirling leaves. In response, the responsive and creative multi-media presentation removes the pictures of the entertainers from the screen, and brings up current weather forecast, while increasing the speed and level of the music. The system will also down rate the individual entertainer data file (news item) but may increase the rating for the entertainer category due to the initial interest, so as to effect how such files or categories are evaluated or accessed in the future. After a set time period that the viewer departed, as determined from the proximity interrupts, the system will search the internet and other potential inputs for matching content and news items to add to the storage for future access. With reference to FIG. 5, the multi-media presentation system 10 is utilized to display a responsive and creative multi-media presentation that is tailored as an advertisement 1000. In this disclosed non-limiting embodiment, a corporate entity 1002 has pre-loaded messages 1010 that include collections of attractor message 1020 generally harmonious in concept with consistent images 1030 and archetypes 1040 expected to be of most interest to the viewer and consistent with the advertisement. The display subsystem 30 may be running a default advertisement at startup if there is no viewer present, but uses the proximity interrupt device 70 to recognize when a viewer is near, and thereby loads a more intrusive and interactive advertisement with audio. The display subsystem 30 may use a second proximity interrupt device set to a closer range, and when the viewer triggers such second proximity interrupt device, the system thereby runs recognition applications to identify the viewer or aspects of the viewer, so as to load advertisements or integrate aspects into the advertisement of greater interest to the viewer. Typically, the viewer will be incorporated into the advertisement.

The multi-media presentation system 10 will then use object recognition and facial recognition algorithms as described above to identify the gender and age of the closest person among the viewers, or an average of the closest group of viewers. The multi-media presentation system 10 then searches the storage subsystem 20 for messages 1010 and pre-loaded data most appropriate for the identified viewers, as discussed above in association with attractor messages 1020 most appropriate thereto. Examples of how the attractor messages 1020 may be selected according to age and gender include examples in which the voice and image of a 20 year old female may be more attractive to male viewers over the age of 15 while the image and voice of a 15 year old male may be more attractive to male viewer under age 12. It should be appreciated that the attractor messages 1020 can be loaded for any number of dimensions that are of most value and interest to the corporate entity 1002, their pre-loaded attractor messages 1020, and these dimensions such as demographics can be further specified with the aid of viewer-identifiers that can tap a database on the storage subsystem storage. Furthermore, the multi-media presentation system 10 can use facial recognition software and viewer-identifiers to identify individual viewers and direct the attractor messages 1020 thereto.

The multi-media presentation system 10 may also determine if there is hierarchy or relationship among viewers, such as but not limited to parent-child, supervisor-supervised, husband-wife, etc. through the database on individual viewers, through body posture and other stimuli to select the more appropriate pre-loaded messages 1010 or otherwise adjust the advertisement. The responsive and creative multi-media presentation follows the presented pattern and attractor messages 1020 with the pre-loaded messages 1010 from the corporate entity 1002. The responsive and creative multi-media presentation may also present visual, auditory, or other stimuli as designed and consistent with the pre-loaded messages to format these stimuli for presentation.

The multi-media presentation system 10 may also detect that the viewers are departing then express other attractor messages 1020 in an attempt to re-initiate attendance or prolong interest. One of the attractor messages 1020 may be "Hey, I'm talking to you" or it may be more customized and sensitive to the tone of the particular viewer. The multi-media presentation system 10 may use, for example, facial recognition software to determine if a viewer is looking at particular objects or stimuli that are distinctive in the environment, to incorporate these elements into the advertisement and thereby make the advertisement more timely, personal and interesting.

As a general strategy, the responsive and creative multi-media presentation integrates faces, clothing, words, tone, etc., of the viewer into the advertisement. If one viewer is shouting or speaking at a higher decibel level than the advertisement, or in gestures that are analyzed to be disruptive or negative, then the multi-media presentation system 10 may reflect that viewer in a humorous or diminutive way into the advertisement. That is, the multi-media presentation system 10 may select words, facial gestures, objects and patterns of clothing that are in opposition to the messages 1010, and use these opposite elements as contrasting elements with archetypes 1040. The multi-media presentation system 10 may alternatively isolate the most positive or interesting responses in a similar method.

The multi-media presentation system 10 may further utilize video or audio recordings to capture gestures and speech of the viewer in real-time and then retain those segments followed by laughter to reinforce interest level, words, phrases, gestures or objects that are part or whole of that data set. The multi-media presentation system 10 may further search internet video sites to determine if popular videos include similar viewers, objects or subjects within the advertisement 1000 to support the advertisement in a timely manner.

The multi-media presentation system 10 may also include a process for the viewer to vote or directly show approval by, for example, touchscreen, spoken word or gesture. Results from such a poll may be collected by the corporate entity 1002 as data and may also influence the advertisement as presented.

The responsive and creative multi-media presentation may adjust the advertisement in real time in response to, for example, a hierarchy or relationship among the viewers, such as but not limited to, parent-child, supervisor-supervised, or husband-wife, to focus the advertisement more specifically. That is, hierarchy is but one example upon which the responsive and creative multi-media presentation may focus-upon or select from among various environment data inputs to be of most interest to the viewer.

The multi-media presentation system 10 may also focus upon the environment data inputs or stimuli that are most likely to be of interest to the viewers. Such interests include, but are not limited to, objects that are moving quickly with respect to the viewer, objects that are flying or not touching the ground for more than a set time period, e.g., a football; objects that are the largest, most colorful, or brightest; objects or viewers that are analyzed to be threats or opportunities by matching to subjects in the archive or in a related search, e.g., money, sex, death, injury, striking colors within the red and yellow spectrum, striped black, or striped black and yellow.

The responsive and creative multi-media presentation may also be reduced to an individual advertisement that can be shared among a group of friends through social media or a device such as a mobile phone. The advertisement may be created through, for example, an extended feedback loop collecting data inputs or a collection of data input, the internet or from an external data source.

In another embodiment, the responsive and creative multi-media presentation is selected by a viewer such as a teacher or parent from among a collection of pre-loaded messages as curriculum, and that are most appropriate for age, grade, gender, or group affiliation that permits influence and interaction. In such an embodiment, the multi-media presentation system 10 may collect performance data integrated with feedback to optimize the interest and understanding of the viewer.

The viewer may also desire to recap missed events in the responsive and creative multi-media presentation, such as the day's sunset or afternoon activities of children of the viewer, in the circumstance that the viewer arrived home after the event. In such an embodiment, the responsive and creative multi-media presentation prepared from a previous time period is integrated within a current responsive and creative multi-media presentation to prolong or condense the timing of events.

In another embodiment, the responsive and creative multi-media presentation is operable to gauge the response of viewers over time, in relation to their own responses, to each other, or in relation to other viewers of a similar or contrary group to determine physiological changes of the viewer. Such a responsive and creative multi-media presentation can operate as a medical measurement to facilitate the practice of medicine by measuring changes in the speed of reaction, comprehension level, or other factors in response to the presentation. As an example, such an embodiment may give an early indication of depression, concussion, effects from drugs, alcohol, or changes to eyesight or hearing. The multi-media presentation system 10 may also facilitate psychological influence of the viewer, such as giving a brighter presentation on a cloudy day. The multi-media presentation system 10 may include any number and variety of direct, active inputs from the viewer that provide medical information in combination with the responses otherwise obtained and presentation otherwise delivered.

The multi-media presentation system 10 may also be connected to a larger network for interaction and monitoring, such as where a teacher directs a curriculum and testing progress, or where a communications professional is gauging response and identifying experts in support or opposition to a viewpoint.

Figure 6:
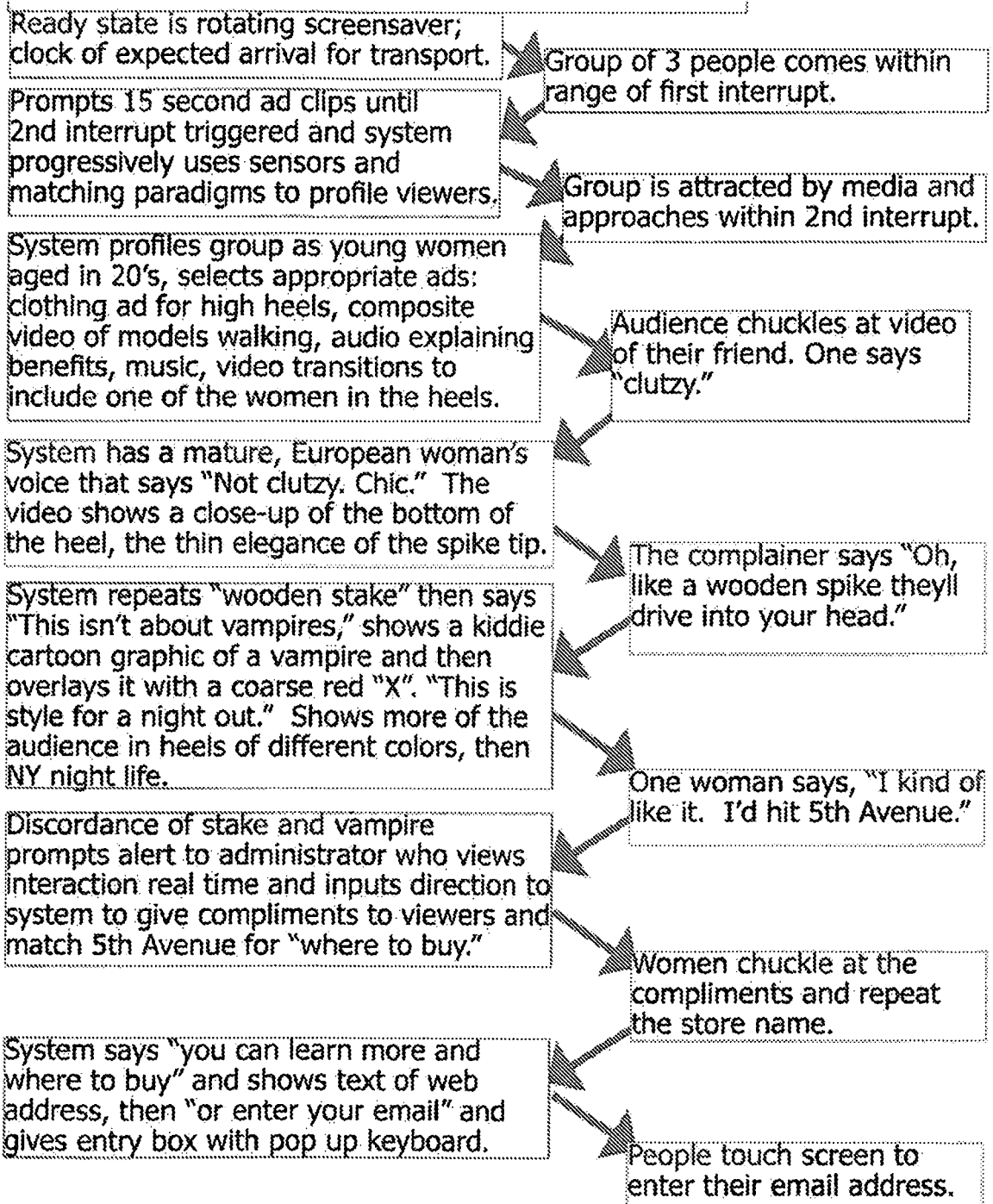
FIG. 6 is a schematic block diagram of one specific viewer process example of the multi-media presentation system in an advertisement type environment.
Figure 7:
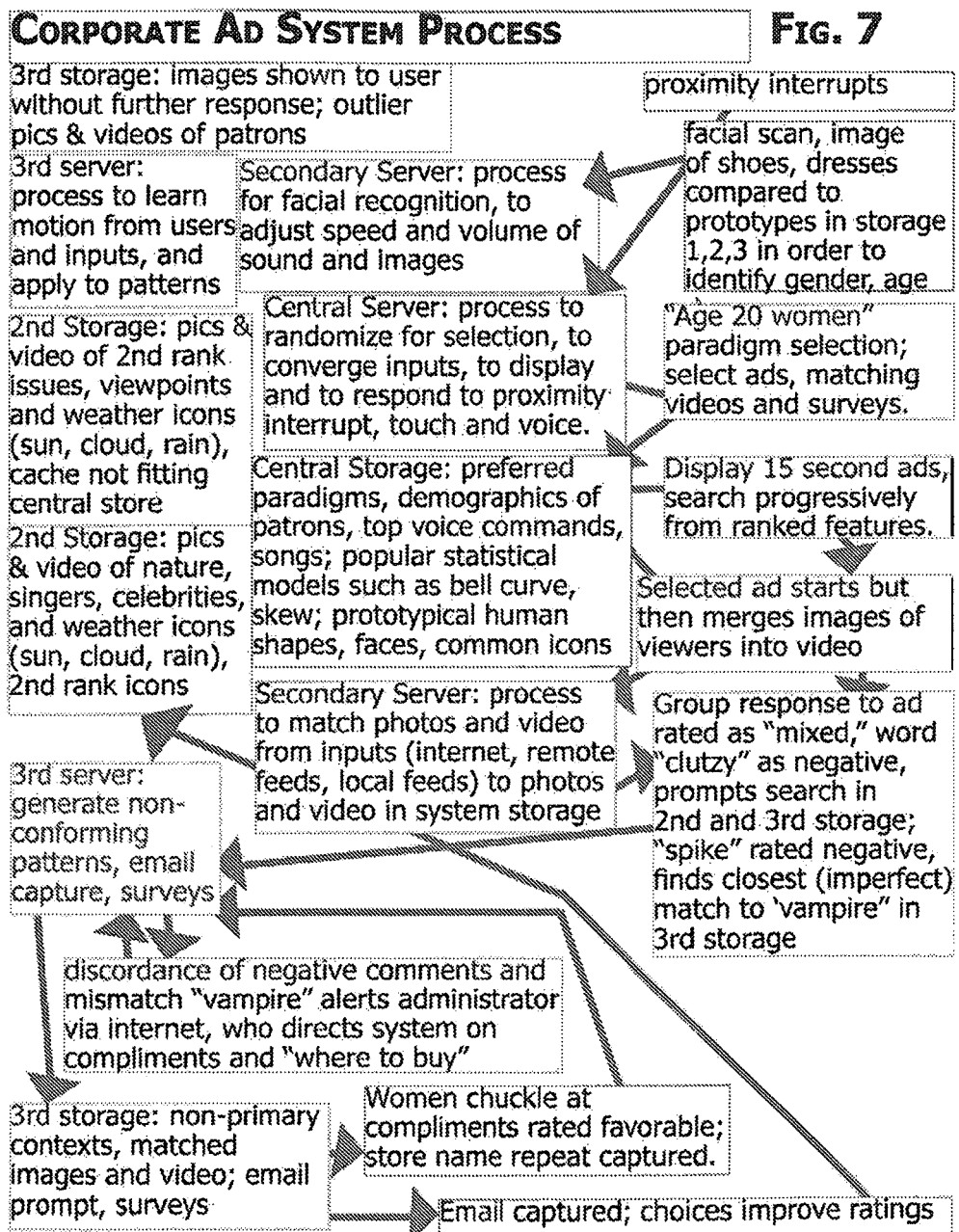
FIG. 7 is a schematic block diagram of a system process representative of data for the user process of FIG. 6.

With reference to FIGS. 6 and 7, one specific example of a responsive and creative multi-media presentation operable to provide an advertisement depicts viewer interaction (FIG. 6) with the associated system process (FIG. 7). It should be appreciated that this example is provided to illustrate a specific interaction by the viewer and should not be considered limiting.

Initially, images operate as a screensaver on the multi-media presentation system 10 with a clock that displays expected arrival and departure times for a transport such as an aircraft or bus. In response to the range interrupt device 70, one or more viewers are thence identified.

The multi-media presentation system 10 displays short video clips until a closer distance interrupt is triggered by the input subsystem 50. The viewers are thence identified as young women about twenty years of age and the responsive and creative multi-media presentation is directed to them. For example, clothing advertisements for high heels will present young women with a composite video of models walking, audio explaining benefits, music. The responsive and creative multi-media presentation then transitions to captured video of one of the viewers walking in heels. One viewer chuckles at the video of their friend and says "klutzy." The multi-media presentation system 10 responds with, for example, a cultured European woman's voice that intones, "Not klutzy. Chic . . . . "

Figure 8:
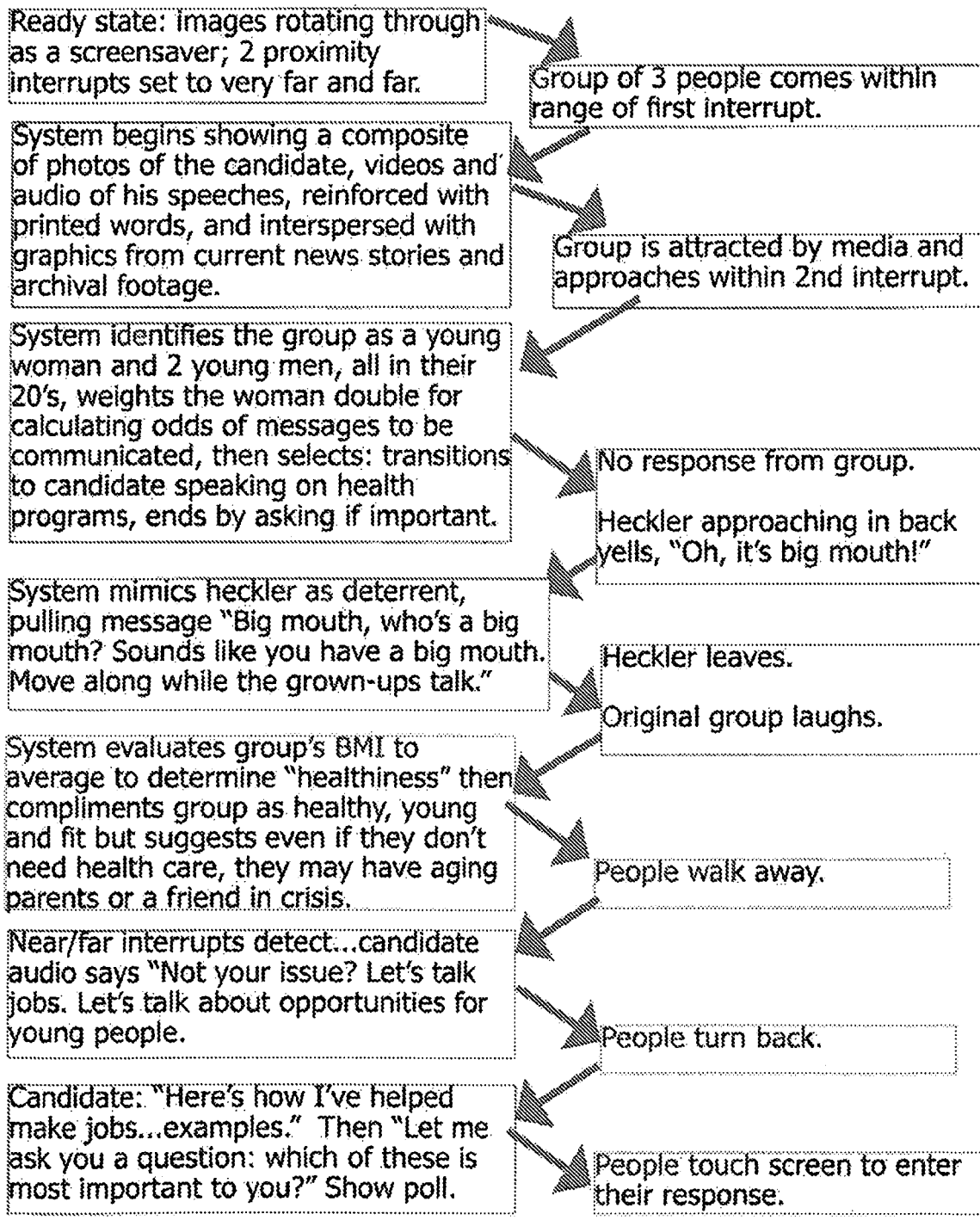
FIG. 8 is a schematic block diagram of one specific viewer process example of the multi-media presentation system in a political advertisement type environment.
Figure 9:
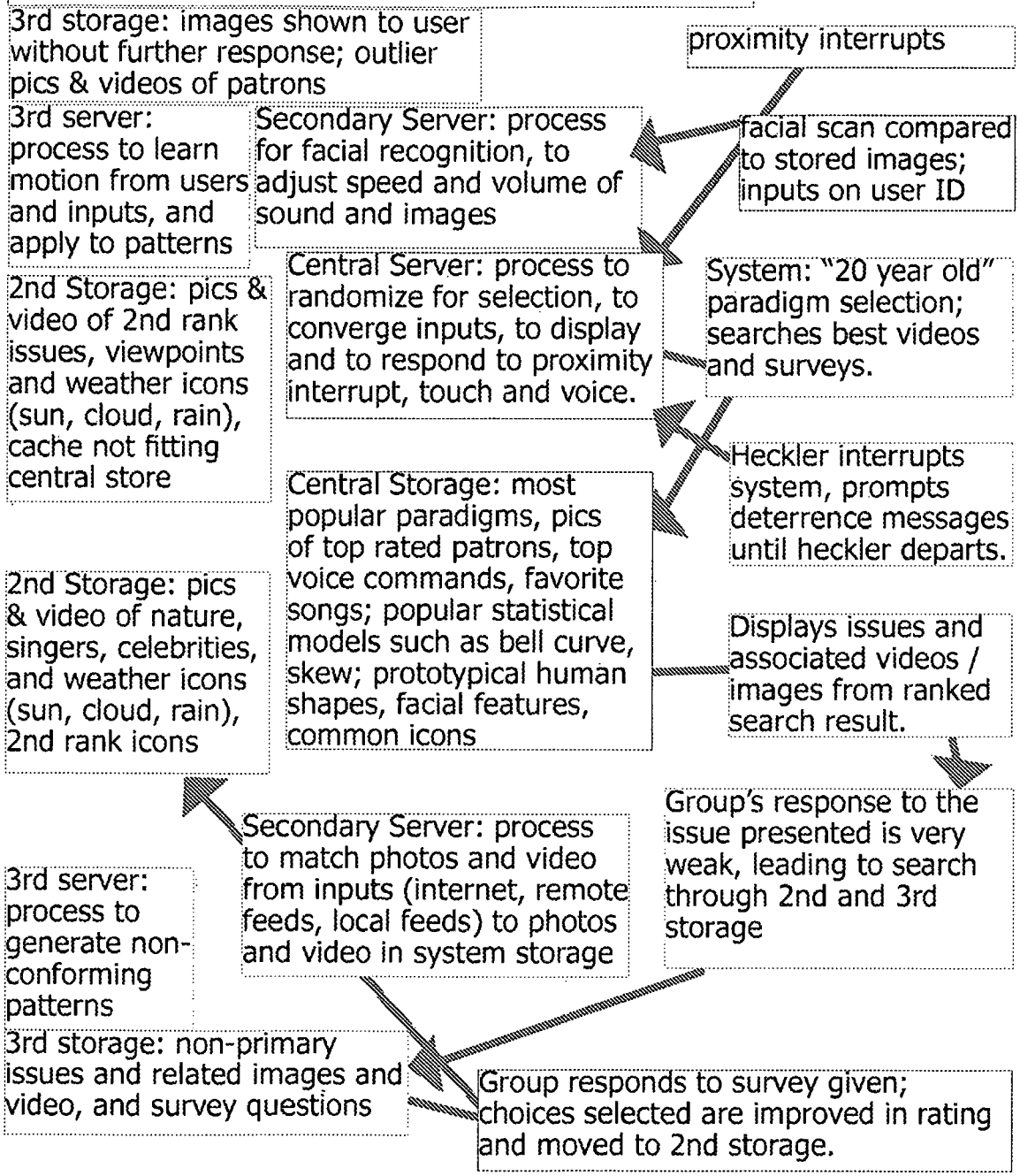
FIG. 9 is a schematic block diagram of a system process representative of data for the user process of FIG. 8.

The responsive and creative multi-media presentation then displays a close-up video of the bottom of the heel, the thin elegance of the spike tip. The complainer says, "Oh, like a wooden spike they'll drive into your head." The responsive and creative multi-media presentation repeats "wooden stake" then exclaims, "This isn't about vampires," and displays a kiddie cartoon graphic of a vampire, then overlays it with a coarse red "X". "This is style for a night out". The multi-media presentation system 10 then displays more of the viewer in heels of different colors, and NY night life. One viewer says, "I kind of like it. I'd hit 5th Avenue." The discordance of the viewer comments and of the system to find a match sends an alert via internet to the administrator, a corporate executive. The administrator views the system interaction in real time and directs the system with coded instructions to deliver messages that are positive compliments and to search the storage for a list of stores stocking the merchandise on 5$^{th}$ Avenue. The viewers respond positively to the compliment and repeat the store name they prefer. The responsive and creative multi-media presentation responds with "you can learn more and where to buy" and displays "or enter your email" with a pop up keyboard so that viewers may input personal information such as an email address by touch screen. With reference to FIGS. 8 and 9, another specific example of responsive and creative multi-media presentation that generates a political message depicts viewer interaction (FIG. 8) with the associated system process (FIG. 9). Initially, the multi-media presentation system 10 rotates images as a screensaver. In response to the range interrupt device 70 identification of one or more viewers, a composite of candidate pictures, videos and audio speeches, reinforced with printed words, and interspersed with graphics from current news stories and archival footage are presented.

Then, in response to the range interrupt device 70 identification that the viewers have approached to within a second closer distance, the multi-media presentation system 10 identifies the viewers as a young woman and two young men, all about twenty years of age. The multi-media presentation system 10 here weights the importance of the woman double for calculating the messages to be communicated based on the expected demographic advantage of the candidate, then transitions to the candidate speaking on health programs and ends by asking if important.

In this example, while no response is given by the original group, a heckler approaches, is detected by the proximity interrupts as an additional but separate person from the group, and then comments are recorded as negative. The multi-media presentation system 10 simultaneously searches a routine to respond and deter the heckler while attending to the group by comparing projected body mass through the input subsystem 50 to determine "healthiness." The multi-media presentation system 10 deters the heckler by mimicking the negative comments and pulling stock messages that direct the heckler to leave. When the multi-media presentation system 10 locates and prepares the messages on health care, the system compliments the group as healthy, young and fit but suggests even if they don't need health care, they may have aging parents or a friend in crisis. When the viewers begin to walk away, the range interrupt device 70 identifies this, and then utilizes audio of the candidate asking "Not your issue? Let's talk jobs. Let's talk about opportunities for young viewers." Should the viewers return, the multi-media presentation system 10 utilizes audio of the candidate stating, "Here's how I've helped create jobs . . . . " Then, "Let me ask you a question: which of these is most important to you?" A poll is then displayed which may be answered by touching the display subsystem 30.

Figure 10:
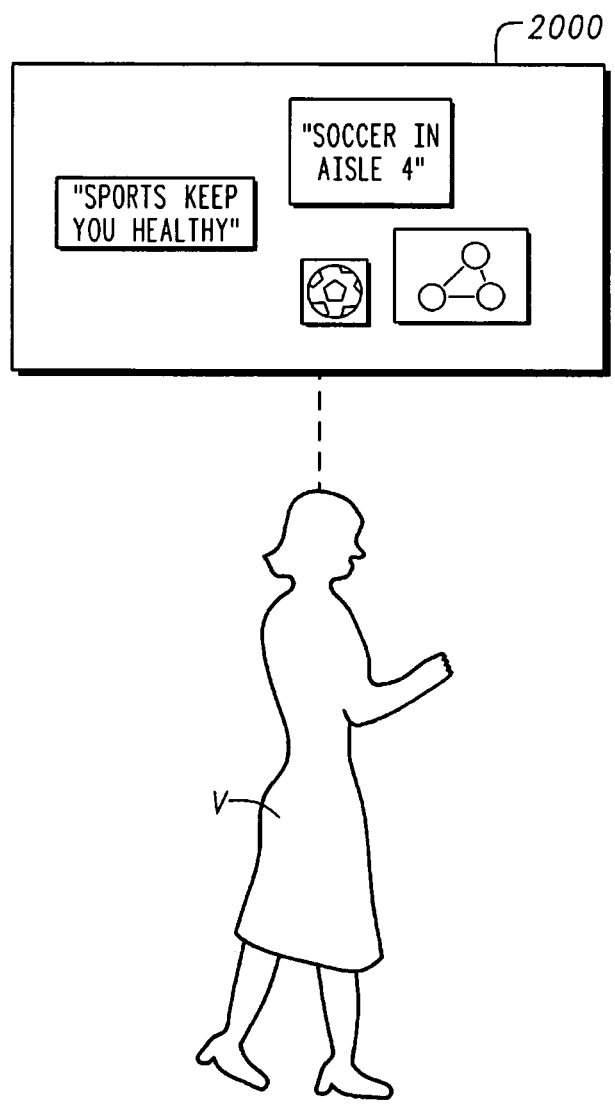
FIG. 10 is a schematic of the multi-media presentation system according to another disclosed non-limiting embodiment.

With reference to FIG. 10, the multi-media presentation system 10 is integrated into a customer service device 2000 such as a kiosk that a viewer may encounter in a retail environment and operate in response to a viewer who touches, speaks or otherwise assertively indicates a need for assistance. For example, the multi-media presentation system 10 may be incorporated within a vending machine, automated teller machine, or any transactional device to attract and engage a patron to purchase, or to disinterest the patron for instance when the purchase is complete and other patrons are waiting.

In another embodiment, the customer service device 2000 is situated in a specific location such as but not limited to the waiting area of a restaurant, doctor office, hair salon or brothel, with the environment specific customization to entertain the viewer while gaining input about potential purchases of the viewer. In such an embodiment, the customer service device 2000 may be a mannequin that perform actions, make gestures, pre-loaded jokes and routines, or dispense items that are entertaining or beneficial to the viewer so as to entice and heighten the likelihood that the viewer will purchase or purchase more.

In the customer service device 2000 in this disclosed non-limiting embodiment, statistical models may be used to determine when a person complaining is an outlier or providing an unfounded complaint in order to present a dissuading message, reduce engagement or otherwise terminate the engagement, and further to record more detail about the viewer to facilitate determination of an emerging trend or change to performance of product or service for the corporate entity. The multi-media presentation system 10 may then store additional information of the outlier or first individual to express this message or position, thereby identified as a potential thought leader, while capturing less information about individuals who repeat or mimic such a message. The multi-media presentation system 10 may also receive data directly such that the customer service response will be seamless, or that the customer service response will be more efficient by reducing the time the multi-media presentation system 10 needs to spend with each interaction or attend and entertain the viewer.

Figure 11:
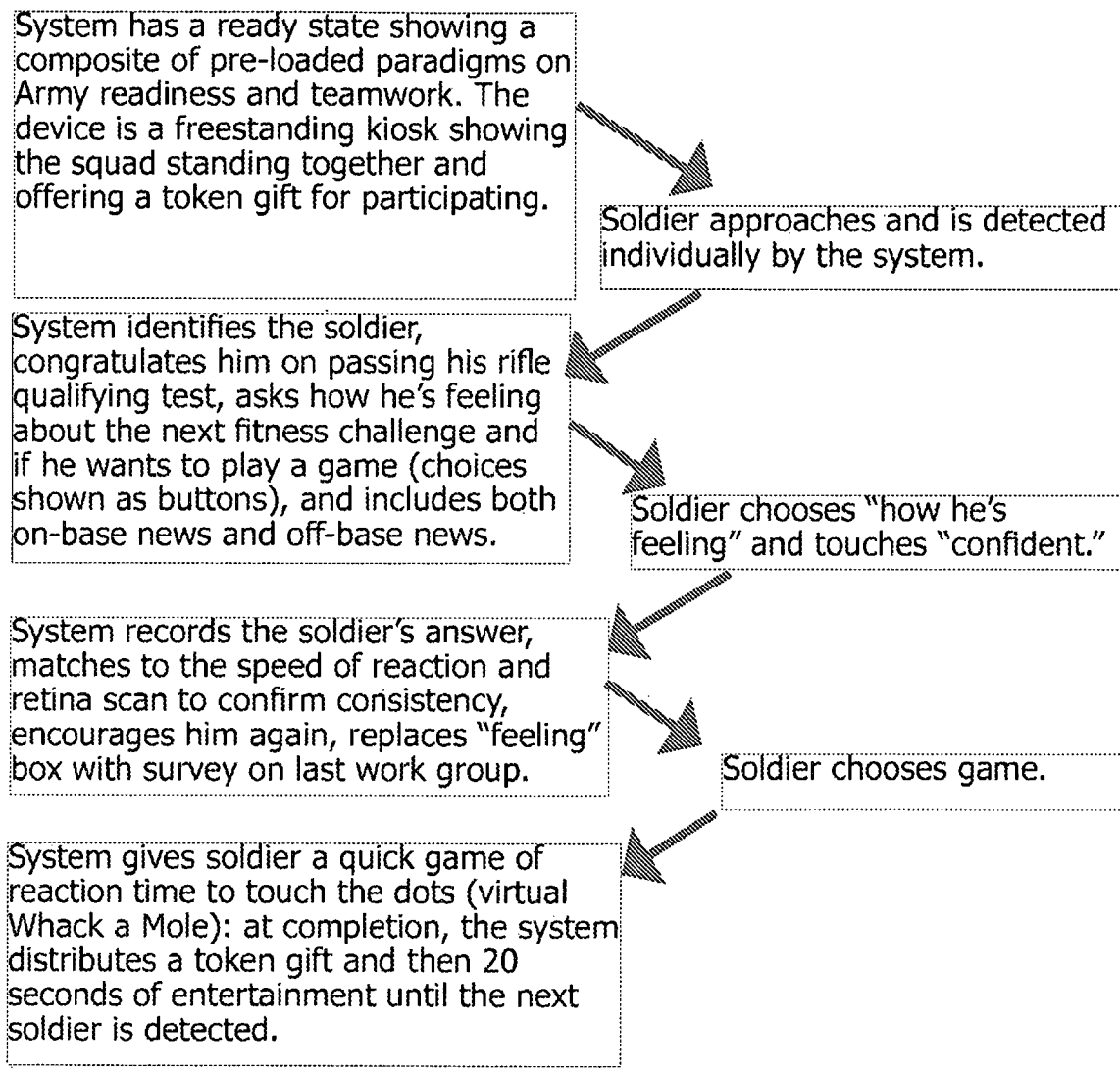
FIG. 11 is a schematic block diagram of one specific viewer process example of the multi-media presentation system in a kiosk type environment.
Figure 12:
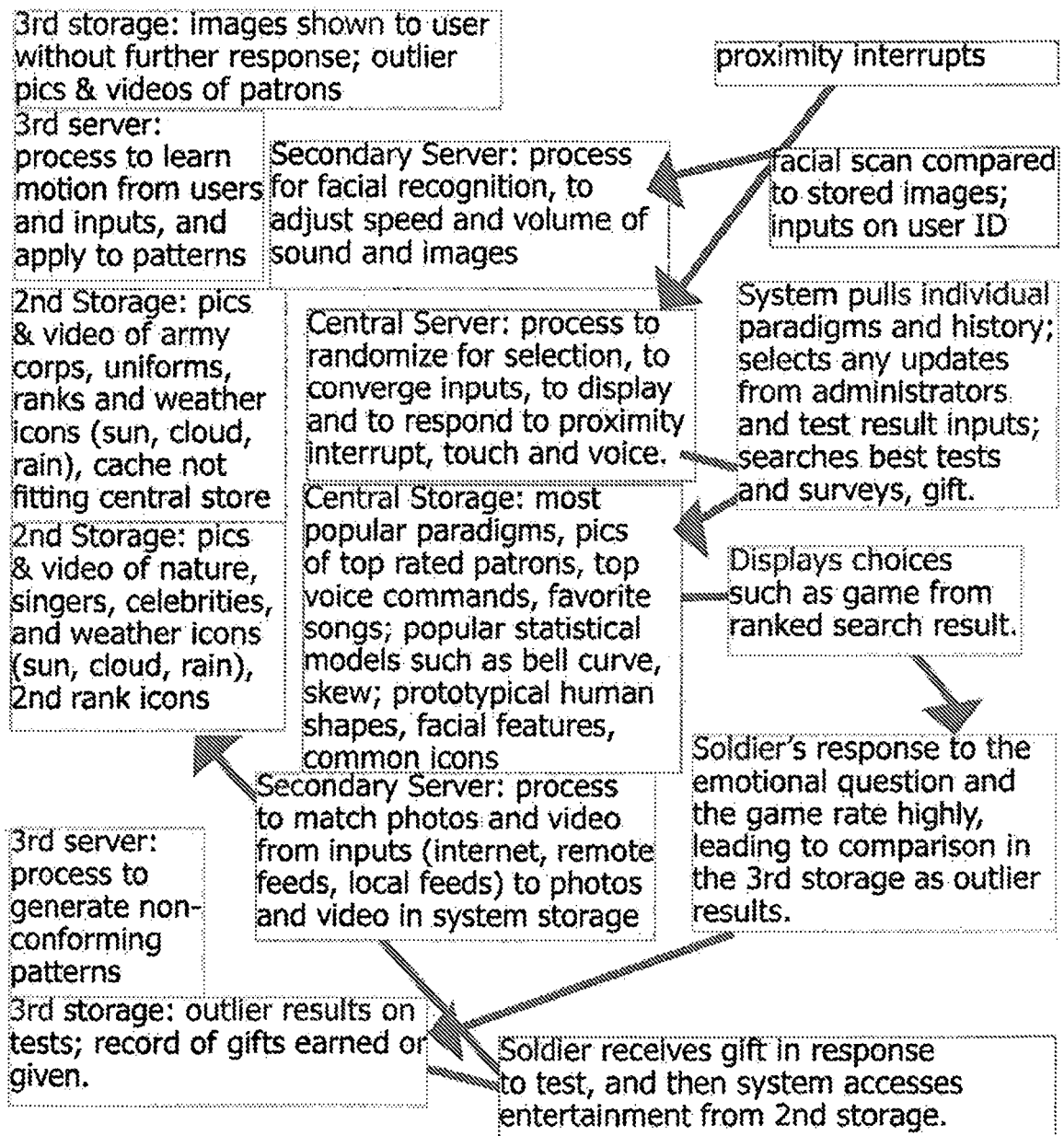
FIG. 12 is a schematic block diagram of a system process representative of data for the user process of FIG. 11.

With reference to FIGS. 11 and 12, one specific example of a responsive and creative multi-media presentation in a kiosk type environment depicts viewer interaction (FIG. 11) with the associated system process (FIG. 12). Initially, the responsive and creative multi-media presentation has a ready state with a composite of pre-loaded paradigms on Army readiness and team work showing the squad standing together and offering a token gift for participating.

In response to the approach of a viewer, the multi-media presentation system 10 identifies the soldier, congratulates him on passing his rifle qualifying test, asks how he's feeling about the next fitness challenge, if he wants to play a game, and includes both on-base news and off-base news. The soldier chooses "how he's feeling" and selects "confident." The multi-media presentation system 10 records the soldier's answer, matched to a history of his speed of reaction and retina scan to confirm consistency, encourages him again with a positive compliment, then replaces "feeling" box with a survey on the last work group. The responsive and creative multi-media presentation then provides a game of reaction time such as virtual Whack a Mole. At completion, the multi-media presentation system 10 distributes a token gift and returns to the ready state until the next soldier is detected.

In another embodiment, the multi-media presentation system 10 is integrated into a retail décor or display, such as, but not limited to, a presentation screen behind a large fish tank in a window of a retail store. Such an embodiment can reflect the current product or service offerings inside the store integrated with the input stimuli of the viewer so as to heighten and continue the interest of potential customers. Such an embodiment may present a type of synesthesia by deliberately translating data input of one type into another type for presentation, such as, but not limited to, taking the sounds recorded from outside the retail store and using these to influence the lights and colors of the responsive and creative multi-media presentation to thereby engage a viewer through their participation and the reaction of the fish. In another example, a scent is dispensed outside a cookie store according to the number of viewers.

In another embodiment, the multi-media presentation system 10 is a large screen or series of screens wrapped around the interior or integrated into the décor of a booth or group seating area within a restaurant so as to attract, entertain and improve the experience of patrons. In this example, the multi-media presentation system 10 may use inputs from a remote location such as Times Square or an alpine mountaintop, so as to create an ambience that will attract and interest patrons. In this embodiment, the patrons may have the option to select or vote to select from among a set of remote locations, either for the restaurant as a whole or for the individual seating area of that group of patrons.

The multi-media presentation system 10 may integrate data inputs of a remote location with the faces, objects, expressions, etc. of other viewers. In such an embodiment, the viewer in one seating area may have the option to select whether they can be viewed by other patrons on separate multi-media presentation systems 20 of those patrons, and the viewer may have an option to view the patrons and the seating area of patrons that have opted to be viewed; such an embodiment may facilitate dating or social encounters in a tavern, as example.

The multi-media presentation system 10 may be active during business hours of the restaurant as well as after the business is closed to identify and record potential criminals as a type of security. The multi-media presentation system 10 may use delaying, dissuading or warning messages and presentations to perpetrators, for example by calling from the far side of a room where a perpetrator is detected "Hey you" or "Who's there" or giving the sound of distant police sirens approaching, or by integrating with police or monitoring services.

Figure 13:
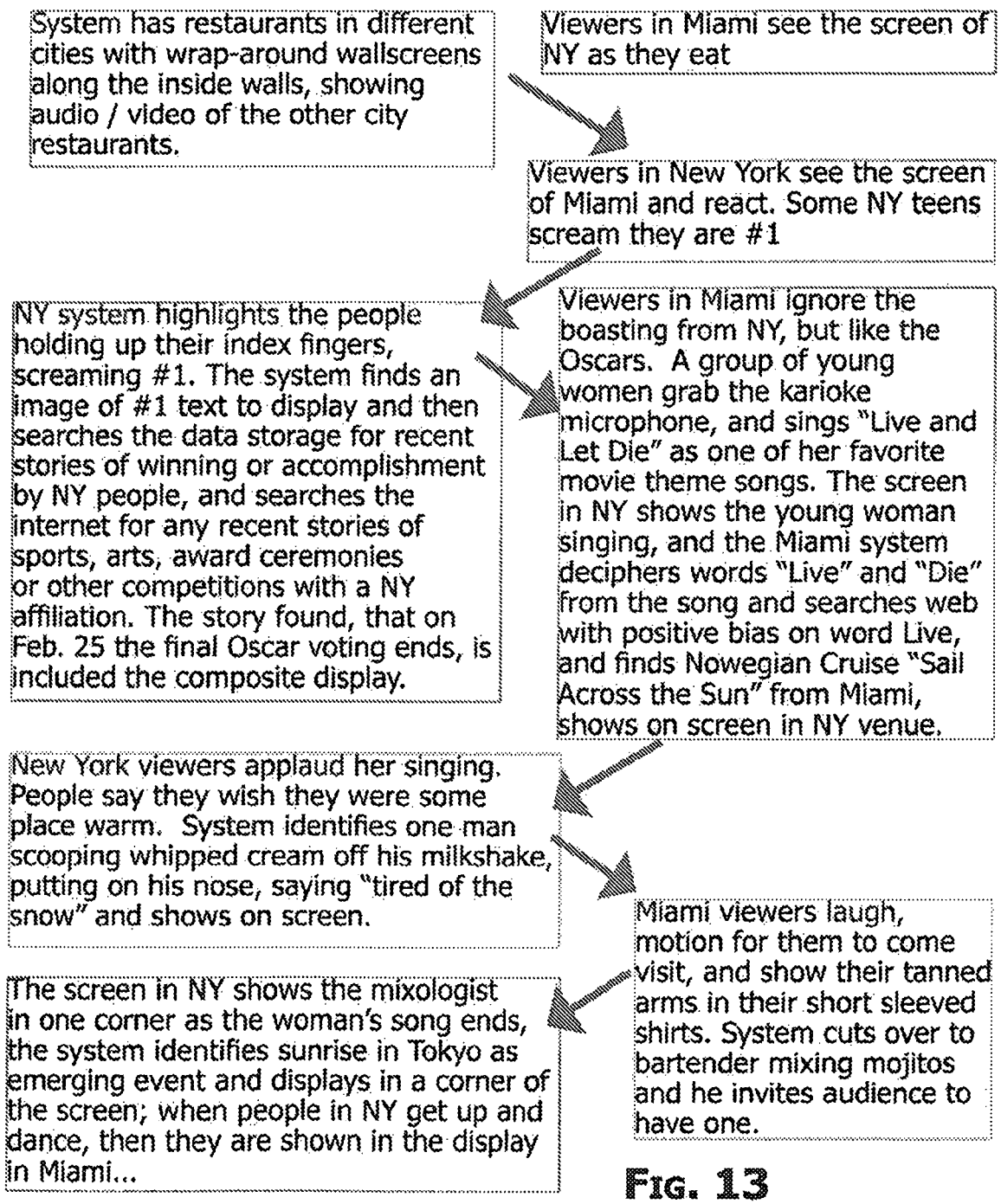
FIG. 13 is a schematic block diagram of one specific viewer process example of the multi-media presentation system in a restaurant type environment.
Figure 14:
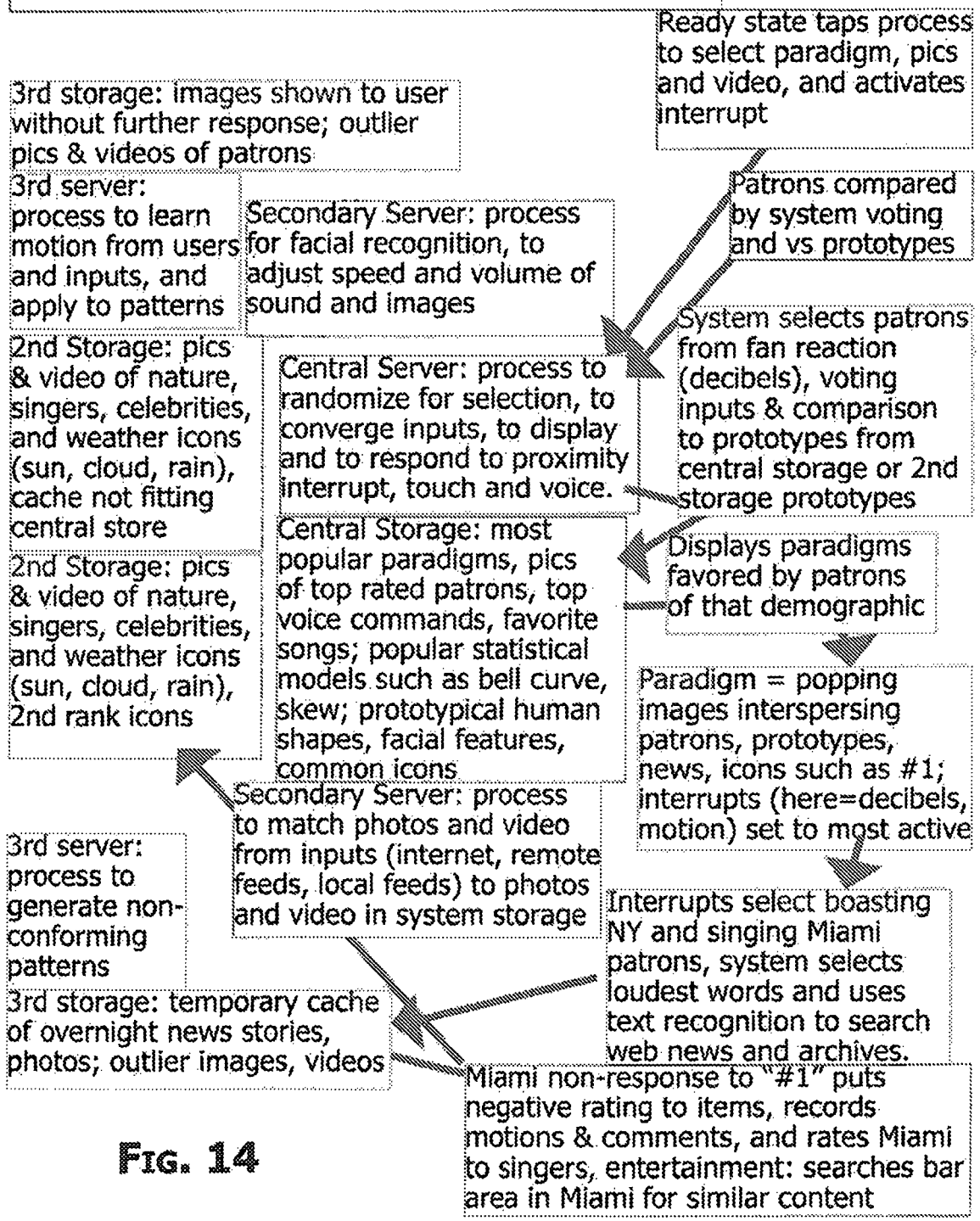
FIG. 14 is a schematic block diagram of a system process representative of data for the user process of FIG. 13.

With reference to FIGS. 13 and 14, one specific example of responsive and creative multi-media presentation in a restaurant type environment depicts viewer interaction (FIG. 13) with the associated system process (FIG. 14). Initially, restaurants in different cities with the multi-media presentation system 10 show audio/video from other city restaurants. This example will describe multi-media presentation system 10 in both a New York and a Miami restaurant. In the restaurant, some New York teens scream they are #1 and the responsive and creative multi-media presentation identifies the decibel level and matches the hand symbol to select and highlight these viewers. The multi-media presentation system 10 displays an image of #1 then searches the storage for recent stories of winning by New York viewers, stories of sports, arts, award ceremonies or other competitions with a New York affiliation for display such as the Oscars.

Viewers in Miami ignore the boasting from New York, but like the Oscar event. A group of young women grab the karaoke microphone, and sing "Live and Let Die" as one of her favorite movie theme songs. The responsive and creative multi-media presentation in New York displays the young woman singing, and the Miami system deciphers words "Live" and "Die" from the song and searches the internet with positive bias on the words "live, to find a cruise "Sail Across the Sun" in Miami, for presentation on the New York display. The New York viewers applaud. New York viewers express their desire to be some place warm. The multi-media presentation system 10 identifies one man scooping whipped cream off his milkshake, putting on his nose, saying "tired of the snow" and displays this as a video clip on the responsive and creative multi-media presentation. The Miami viewers laugh, motion for them to come visit, and show their tanned arms in their short sleeved shirts. The responsive and creative multi-media presentation cuts over to a bartender mixing drinks who invites the viewer to have one.

The responsive and creative multi-media presentation in New York then displays the bartender in one corner as the woman's song ends, and identifies the sunrise in Tokyo as an emerging event for display in a corner of the responsive and creative multi-media presentation. When viewers in NY get up and dance, they are shown in the responsive and creative multi-media presentation in Miami.

Figure 15:
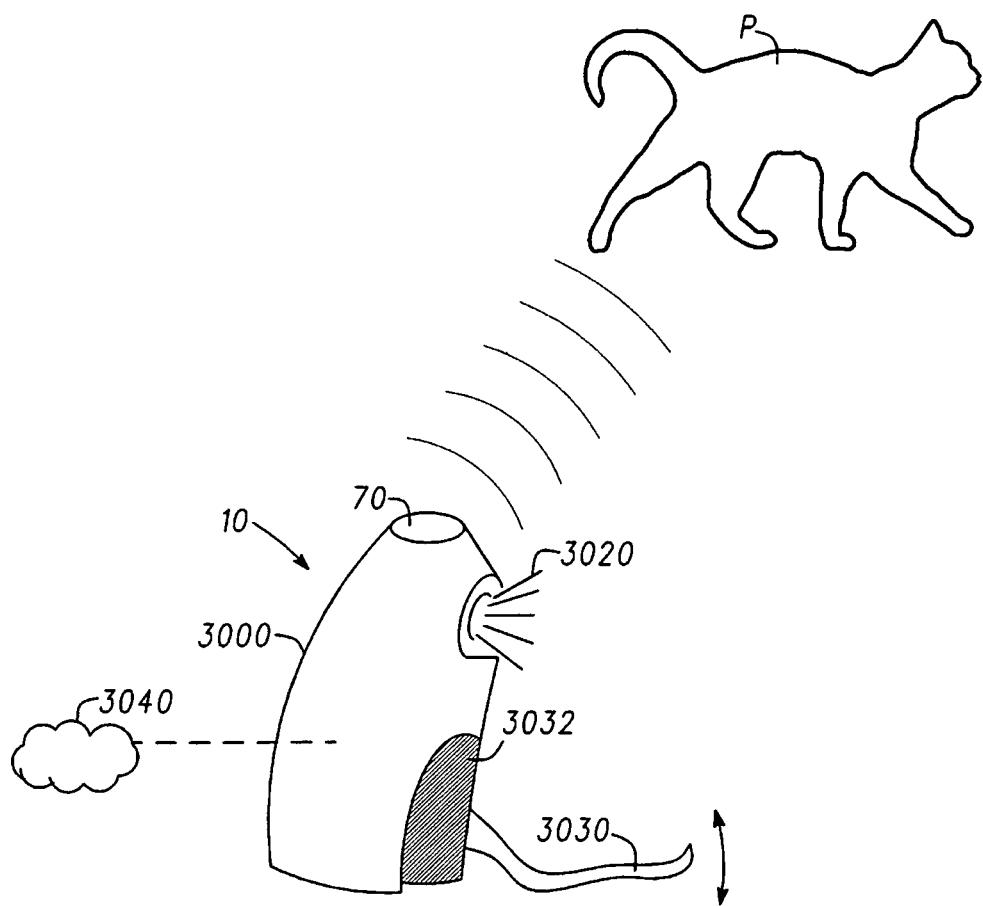
FIG. 15 is a depiction of one disclosed non-limiting embodiment integrated into an interactive creature device.

With reference to FIG. 15, in another disclosed non-limiting embodiment, the multi-media presentation system 10 is integrated with a pet amusement device 3000. The multi-media presentation system 10 has pre-loaded stimuli and actions expected to be of interest to the animal, which may not be perceptible or of interest to humans. As example, the stimuli may be a sound such as a bird call when the pet approaches with the expectation that the pet 3010 may believe there is a bird in the area without dismissing the sound.

The amusement device 3000 may be in an idle or default state, but uses the range interrupt device 70 with a set distance to optimize the interest level of the pet P. For example, an action may be the recoil of a toy 3030 resembling a mouse-tail into a hidden area 3020 that will cause the pet to approach and engage for an extended time. Such a multi-media presentation system 10 can gauge the pet behavior to create more attractors when the pet 3010 is moving away and use the progressive presentation of stimuli by integrating which stimuli are analyzed to be most interesting to the pet and also which stimuli are most different but have not been used previously or recently.

The responsive and creative multi-media presentation can be refined by the owner of the pet to amuse the pet during set time periods or for a total amount of time daily, so as to create an exercise routine or otherwise engage the pet during the day and thereby reduce its nocturnal activity. The multi-media presentation system 10 can also be linked to an external data source 3040 such as the internet, phone or other communication media, so that a multi-media presentation system 10 can monitor, integrate direction or otherwise gain amusement from the pet from a remote location (FIG. 16).

The multi-media presentation system 10 may further enable later viewing of a presentation prepared from a previous time period as if the multi-media presentation system 10 had been present with the creature or now including the multi-media presentation system 10 as viewer integrated with such a presentation. Such a responsive and creative multi-media presentation can be integrated into feeding, defecation, or any of the various animal care displays. It should be appreciated that the multi-media presentation system 10 can use other stimuli such as odors that will be of most interest to the pet, wild animals, livestock or other creatures for their amusement, education, animal control, or a multitude of purposes. It should be further appreciated that the multi-media presentation system 10 can engage wild animals, livestock or other creatures in a negative method as well as positive, so as to repel or deter their behavior.

The multi-media presentation system 10 beneficially provides a dynamic art form through a customary device such as a television, mobile phone, a non-customary device such as a dancing doll or singing mannequin, or even through an automated customer service response.

Figure 16:
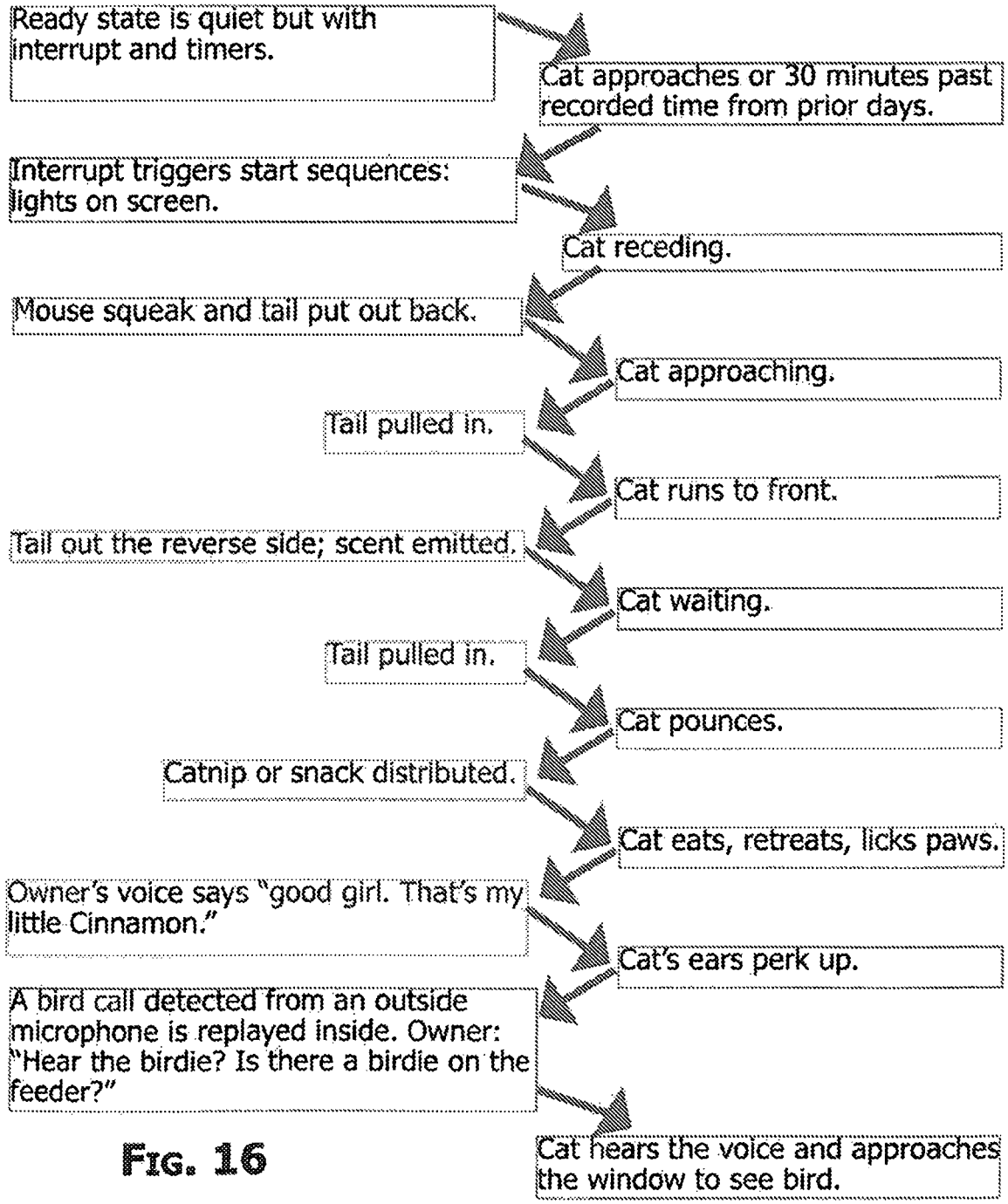
FIG. 16 is a schematic block diagram of one specific viewer process example of the multi-media presentation system in an interactive creature environment.
Figure 17:
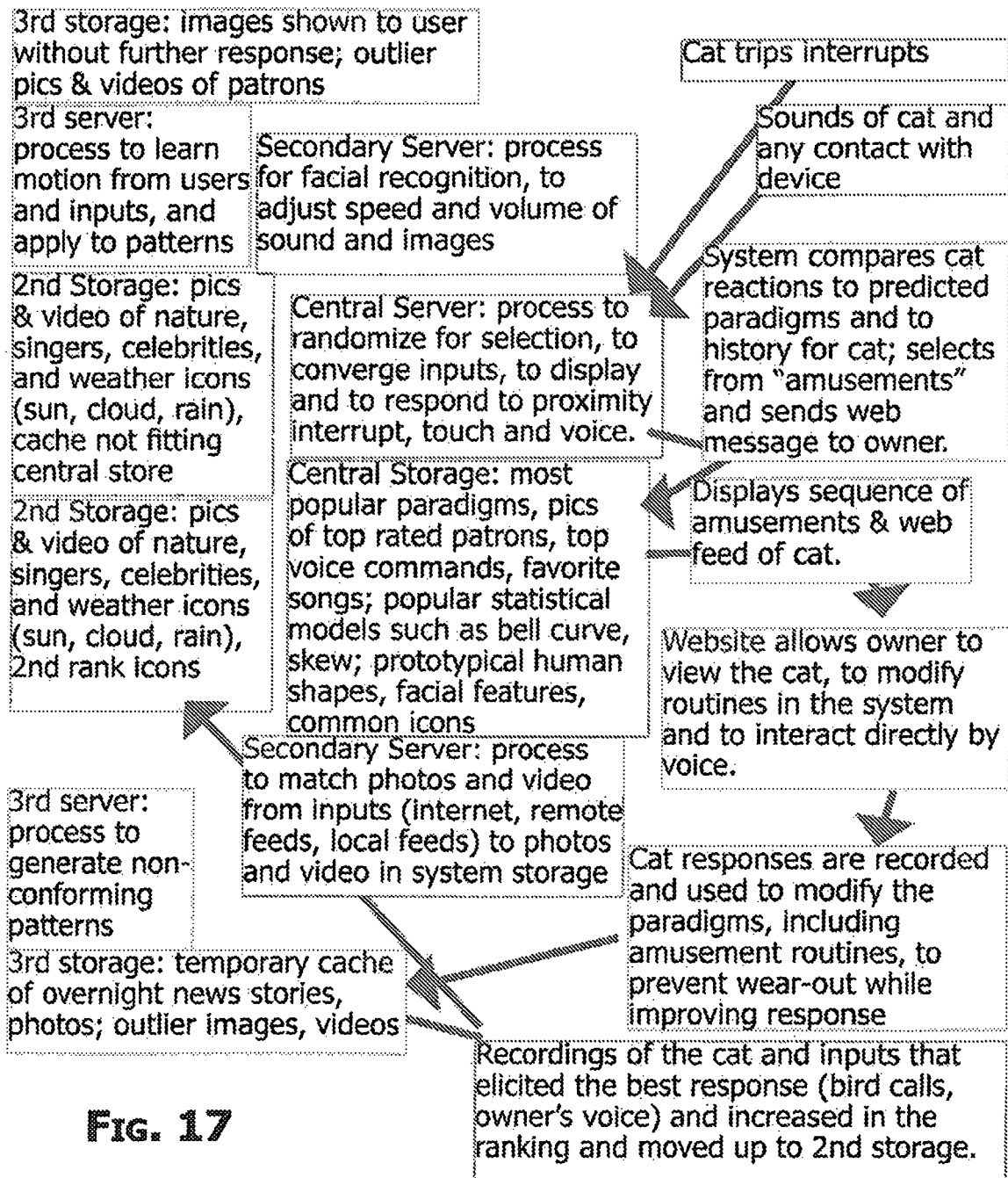
FIG. 17 is a schematic block diagram of a system process representative of data for the interactive creature device process of FIG. 16.

With reference to FIGS. 16 and 17, one specific example of responsive and creative multi-media presentation in a responsive and creative multi-media presentation in the pet amusement device 3000 illustrates interactions (FIG. 16) with the associated system process (FIG. 17). Initially, the multi-media presentation system 10 ready state is quiet but with interrupt and timers. If the pet interaction is past previously recorded times from prior days, the proximity interrupt device 70 triggers start sequences for lights and sounds such as a mouse squeak and the tail put out back. The responsive and creative multi-media presentation generally compares pet reactions to predicted paradigms and to a history for the cat, then selects from "amusements" and may send web messages to the owner. A website allows the pet owner to view the cat, modify routines, in the multi-media presentation system and to interact directly by voice.

Throughout this application, the terms viewer, audience, and user are all defined to mean an individual person, creature, group of individuals, group of creatures, corporate entity, legal entity, government entity, or sponsor that attends to the multi-media presentation system 10 and may perceive one or more pieces of sensory data from the responsive and creative multi-media presentation.

Throughout this application, the expression "unassisted data input of the viewer" refers to data collected about the viewer without the viewer giving keyboard input, touching, a device to give a reading, communicating commands such as by speech, or transmitting other medical information via a device.

Throughout this application, the definition of a natural, unaided sensing range of the viewer or viewer will mean the distance from which the viewer or viewer could be seen by the naked eye, heard by the unaided human ear, touched; smelled or corresponding ranges where a creature is the viewer and could use one its sensory organs to sense one of its kind.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A multi-media presentation system to engage a viewer, the multi-media presentation system comprising:
   an input subsystem that collects input data about the viewer with respect to an advertising message and wherein the viewer does not actively provide said input data and collecting of the input data is performed without identifying an individual identity of the viewer;
   a storage subsystem that stores archetypes as configurations of data related to the advertising message, and that stores the collected input data from the input subsystem that matches the viewer with at least one element of the archetypes, wherein the storage subsystem comprises a central storage device and a secondary storage device, the central storage device is allocated to store a favorable archetype and the secondary storage device is allocated to store less favorable archetypes, each of the central storage device and the secondary storage device is allocated to store acquired data with a different and predetermined level of statistical variations of the archetypes;

a processor in communication with the input subsystem and the storage subsystem, the processor analyzes the collected input data in comparison to said archetypes to predict at least one element of the advertising message that is of interest to the viewer, the processor generates a customized multi-media presentation in real time that incorporates as content at least one element of the collected input data that matches the viewer with the at least one element of the advertising message that is of interest to the viewer to direct the advertising message to the viewer, wherein the processor automatically generates a customized attractor message to engage with the viewer upon recognizing the viewer within a predetermined proximity of the multi-media presentation system; and a display subsystem to display the customized multi-media presentation.

2. The multi-media presentation system of claim 1, wherein the input data is collected through at least one of: a range interrupt device, a visual scanning device or an audio device.

3. The multi-media presentation system of claim 1, wherein the input data is collected through at least one of: an odor measuring device, an electric pulse measuring device, a color measurement device or a weather measurement device.

4. The multi-media presentation system of claim 1, wherein the central storage device and the secondary storage device are configured according to a composition used to structure the input data, the composition altered according to a statistical model of the collected input data.

5. The multi-media presentation system of claim 1, wherein the processor is operable to analyze the collected input data and operable to modify said archetypes in response to analyzing the collected input data.

6. The multi-media presentation system of claim 1, wherein the collected input data is analyzed based on age, grade, gender, location, demographic, personal characteristic, group affiliation or relationship, or psychological behavior, and the customized multi-media presentation is generated to attract or repulse the viewer based on analyzing of the collected input data.

7. The multi-media presentation system of claim 1, wherein the customized multi-media presentation is incorporated into a kiosk, transaction machine, vending machine, retail display, decor, mannequin, creature care system, security system or phone system.

8. The multi-media presentation system of claim 1, further comprising a dispenser operable to dispense an item or service with the customized multi-media presentation.

9. The multi-media presentation system of claim 1, wherein the input subsystem is operable to communicate with at least one additional multi-media presentation system.

10. The multi-media presentation system of claim 1, wherein the processor is operable to detect words or objects from the collected input data to integrate into the customized multi-media presentation.

11. The multi-media presentation system of claim 1, wherein the input subsystem comprises a control panel where an administrator, provider or a viewer can enter or select data or organization.

12. The multi-media presentation system of claim 1, wherein the collected input data is received from a remote device.

13. The multi-media presentation system of claim 1, wherein the input subsystem further comprises communication through remote connection to administer, control, adjust or monitor the multi-media presentation system remotely.

14. The multi-media presentation system of claim 1, further comprising selecting whether the viewer can be viewed through a second multi-media presentation device.

15. The multi-media presentation system of claim 1, wherein the display subsystem is operable to view another viewer at another location through a second multi-media presentation device.

16. The multi-media presentation system of claim 1, wherein the processor incorporates a vote, a poll, a choice, or a test answer from the input subsystem into the customized multi-media presentation.

17. The multi-media presentation system of claim 1, wherein the input subsystem is operable to identify a physiological or psychological change in the viewer over time or in comparison to a group.

* * * * *